(12) United States Patent
Powell et al.

(10) Patent No.: US 7,085,731 B1
(45) Date of Patent: Aug. 1, 2006

(54) COMPUTER SYSTEM CONFIGURATION AND METHOD FOR A STORE

(75) Inventors: Ken R. Powell, Athens, GA (US); Kevin W. Hartley, Marblehead, MA (US); Eleanor B. Maxwell, Crawford, GA (US); Corey C. Snook, Meredith, NH (US)

(73) Assignee: SoftCard Systems, Inc., Watkinsville, GA (US)

( * ) Notice: Subject to any disclaimer, the term of this patent is extended or adjusted under 35 U.S.C. 154(b) by 0 days.

(21) Appl. No.: 09/301,749

(22) Filed: Apr. 29, 1999

(51) Int. Cl.
*G06F 17/60* (2006.01)

(52) U.S. Cl. .................... 705/14; 705/26; 705/16; 235/375; 235/2; 235/383

(58) Field of Classification Search ............ 705/14, 705/16–17, 20–21, 23; 235/375, 378; 700/232, 700/236; G06F 17/60, 17/40, 19/00
See application file for complete search history.

(56) References Cited

U.S. PATENT DOCUMENTS

| | | | |
|---|---|---|---|
| 4,674,041 A | | 6/1987 | Lemon et al. |
| 4,882,675 A * | | 11/1989 | Nichtberger et al. .......... 705/14 |
| 5,192,845 A * | | 3/1993 | Kirmsse et al. ............. 219/110 |
| 5,192,854 A | | 3/1993 | Counts |
| 5,227,874 A | | 7/1993 | Von Kohorn |
| 5,256,863 A * | | 10/1993 | Ferguson et al. ............. 705/21 |
| 5,393,965 A | | 2/1995 | Bravman et al. |
| 5,471,669 A * | | 11/1995 | Lidman ...................... 235/383 |
| 5,490,060 A * | | 2/1996 | Malec et al. ................... 705/10 |
| 5,646,389 A | | 7/1997 | Bravman et al. |
| 5,697,844 A | | 12/1997 | Von Kohorn |
| 5,727,153 A | | 3/1998 | Powell |
| 5,759,101 A | | 6/1998 | Von Kohorn |
| 5,832,458 A | | 11/1998 | Jones |
| 5,884,278 A * | | 3/1999 | Powell ........................ 705/14 |
| 5,916,024 A | | 6/1999 | Von Kohorn |
| 6,041,309 A * | | 3/2000 | Laor ........................... 705/14 |
| 6,415,341 B1 * | | 7/2002 | Fry et al. ...................... 710/62 |
| 6,450,407 B1 * | | 9/2002 | Freeman et al. ............ 235/492 |
| 6,456,980 B1 * | | 9/2002 | Powell ........................ 705/14 |
| 6,885,994 B1 * | | 4/2005 | Scroggie et al. .............. 705/14 |
| 6,920,611 B1 * | | 7/2005 | Spaeth et al. ............... 715/700 |

OTHER PUBLICATIONS

MacFarlane S J , Computers in retailing, Comput. J. Abstr., Can. Data Syst. vol. 12 No. 5 May 1980 (from Dialog(R) File 248, acc. No. 00071168).*

Wilson R H., Scanning and coding: the pace quickens, I.G.D. Mark. Place, vol. 2 No. 2, Mar./Apr. 1981 (from Dialog(R) File 248, acc. No. 00053816).*

(Continued)

*Primary Examiner*—Cuong Nguyen
(74) *Attorney, Agent, or Firm*—Jackson Patent Law Office

(57) ABSTRACT

Disclosed are computer system configurations and methods for a retail store. In an exemplary system, a CPU and program in a checkout station make a list of the products selected by the customer. The CPU and program processes paper coupon information in the context of the selected products to determine discount eligibility. Another CPU and program in the checkout station perform electronic coupon redemption, by processing the selected products in the context of electronic coupon information.

12 Claims, 36 Drawing Sheets

OTHER PUBLICATIONS

Moving retail operations into open systems—IBM Distributed Data Services and Controller Services Feature for Windows NT, International Business Machines Corporation 1998, Feb. 1998. (5 pages).

Printout from www.matra.co.uk/products/freedom/shopper.htm, received via the World Wide Web on Jul. 13, 1999. (1 page).

Printout from www.matrasys.com/Products/Freedom/tshop.asp, "Last Modified: Dec. 23, 1997", received via the World Wide Web on Jul. 13, 1999. (4 pages).

Printout from www.r2corp.com/products_rstore_rpro.htm, received via the World Wide Web on Dec. 21, 1998 (1 page).

Rpro IBM Solid State Disk (SSD) w/RS-232 Fact Sheet, (c) 1998 R2 Corporation SSD Factsheet092798.Rev. (4 pages).

* cited by examiner

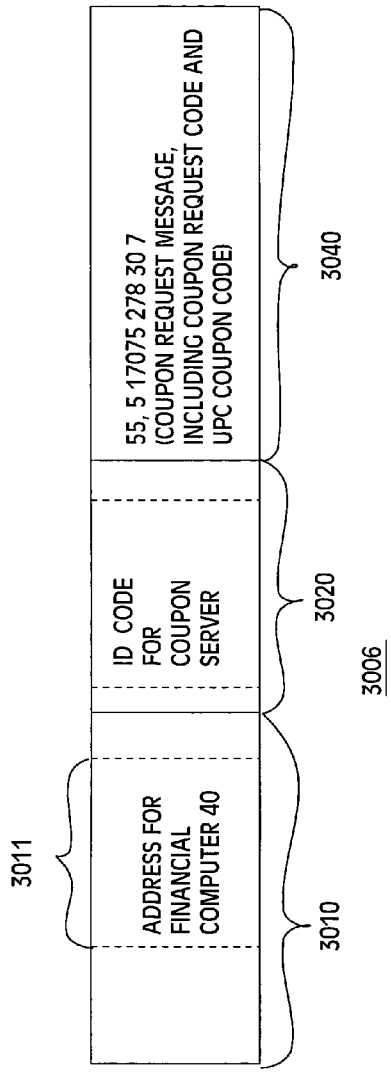
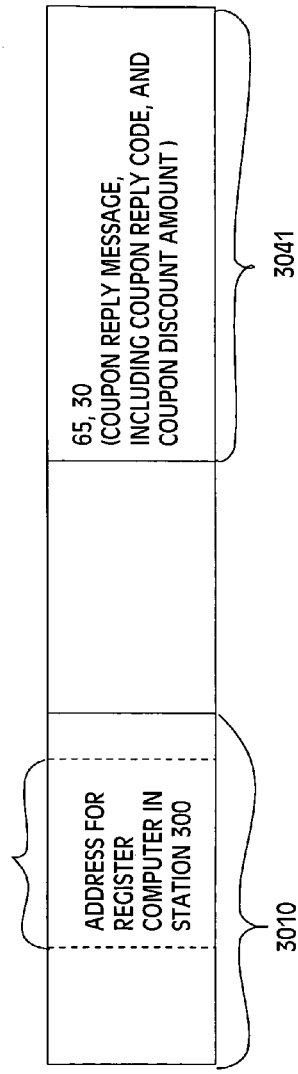
Fig. 11
Fig. 12

| | | | |
|---|---|---|---|
| 3656 | 01707542312 | 2 | 20 |
| 0054 | 01705424943 | 0 | 75 |
| 1317 | 01703149873 | 0 | 50 |

| | |
|---|---|
| 01703149873 | Old World Pasta |
| 01705424943 | Lighthouse Light Bulbs |
| 01707542312 | Acme Ammonia |

| Coupon ID | UPC | SU Flags | Qualifier Type | Qualifier Qty. | Flags/ Reward Type | Redeem Limit | Tender Type | Reward Amount (BCD) | Cont. Record | Redemption Count (2 byte int.) | Dispensed Count (2 byte int.) |
|---|---|---|---|---|---|---|---|---|---|---|---|
| Coupon ID | UPC | SU Flags | Qualifier Type | Qualifier Qty. | Flags/ Reward Type | Redeem Limit | Tender Type | Reward Amount (BCD) | Cont. Record | Redemption Count (2 byte int.) | Dispensed Count |
| Coupon ID | UPC | SU Flags | Qualifier Type | Qualifier Qty. | Flags/ Reward Type | Redeem Limit | Tender Type | Reward Amount (BCD) | Cont. Record | Redemption Count (2 byte int.) | Dispensed Count |
| ⋮ | | | | | | | | | | | |
| Coupon ID | UPC | SU Flags | Qualifier Type | Qualifier Qty. | Flags/ Reward Type | Redeem Limit | Tender Type | Reward Amount (BCD) | Cont. Record | Redemption Count (2 byte int.) | Dispensed Count |
| Coupon ID | UPC | SU Flags | Qualifier Type | Qualifier Qty. | Flags/ Reward Type | Redeem Limit | Tender Type | Reward Amount (BCD) | Cont. Record | Redemption Count (2 byte int.) | Dispensed Count |

Fig. 35

| Qualifier Type (hex) | Qualifier Quantity Represents |
|---|---|
| 0 | Item Count (UPC field represents Item) |
| 1 | Item Dollar Value (UPC field represents Item) |
| 2 | Item Weight (UPC field represents Item) |
| 3 | Item Non-Redeem |
| 4 | (unused) |
|  | ... |
| 10 | Department Count (UPC field represents Dept #) |
| 11 | Department Dollar Value (UPC field represents Dept #) |
| 12 | Department Weight (UPC field represents Dept #) |
| 13 | Department Non-Redeem |
| 14 | (unused) |
|  | ... |
| 20 | Total Count (UPC field ignored) |
| 21 | Total Dollar Value (UPC field ignored) |
| 22 | Total Weight (UPC field ignored) |
| 23 | Total Non-Redeem |
| 24 | (unused) |

Fig. 36

| Bit | Flag Name | Description |
|---|---|---|
| 0 | Member | Offer available only with card |
| 1 | Tax | Tax (Vendor Coupon) |
| 2 | PP Limit | Limit to Purchase Price (of Item, Dept, Total) |
| 3 | Wildcard | UPC contains wildcard characters |

Fig. 37

| Reward Type | Description |
|---|---|
| 0 | Cents Off |
| 1 | Dollars Off |
| 2 | Percent Off |
| 3 | Free |
| 4 | Amount Off Per Unit Weight |
| 5 | Special Price (cents) |
| 6 | Special Price (dollars) |
| 7 | Continuity Only (deferred award) |
| 8 | Record Only (no award) |
| 9 | (reserved) |
| ... | |
| 15 | (reserved) |

Fig. 38

COMPUTER SYSTEM CONFIGURATION AND METHOD FOR A STORE

BACKGROUND OF THE INVENTION

1. Field of the Invention

This invention relates generally to a store and, more particularly, to a computer system configuration and method for processing discount information in a retail store.

2. Description of Related Art

Product promotions employing price discounts are a popular means to stimulate sales of products such as grocery store items. One type of product promotion is a discount coupon. It has been estimated that in-store couponing coupled with advertising increases sales by 544%.

SUMMARY OF THE INVENTION

It is an object of the present invention to provide a computer configurations and methods for processing discount information in a retail system.

To achieve these and other objects of the present invention, there is a system for operating with a store having a plurality of products. The system comprises a plurality of cash register stations, each cash register station including an electromagnetic detector for generating first signals corresponding to product pricing and for generating second signals identifying products selected for purchase; a first processing unit that executes a first program in a first memory to correlate second signals with first signals, wherein the system also includes a plurality of second processing units, each second processing unit executing a second program in a second memory and receiving second signals from the electromagnetic detector, in a respective one of the cash register stations, to send a third signal to the first processing unit, wherein the first processing unit displays an amount due in accordance with the third signal.

According to another aspect of the present invention, there is a method for a system including a store having a plurality of products, and a plurality of cash register stations the method comprising generating first signals corresponding to product pricing and for generating second signals identifying products selected for purchase; executing a first program in a first memory to correlate second signals with first signals, wherein the method also includes executing a second program in a second memory and receiving second signals generated in a respective one of the cash register stations, to send a third signal to the first program, wherein the program displays an amount due responsive to the third signal.

According to yet another aspect of the present invention, there is a system for operating with a plurality of portable cards each having a card memory, and a store having a plurality of products. The system comprises a plurality of cash register stations, each cash register station including an electromagnetic detector for generating first signals corresponding to product pricing and for generating second signals identifying products selected for purchase; a card interface for reading third signals corresponding to product pricing from the card memory of one of the portable cards; a first processing unit that executes a first program in a first memory to correlate second signals with first signals, wherein the system also includes a plurality of second processing units, each second processing unit executing a second program in a second memory, to correlate second signals from the electromagnetic detector, in a respective one of the cash register stations, the with third signals read by the card interface, in the respective one of the cash register stations.

According to yet another aspect of the present invention, there is a system for operating with a plurality of portable cards each having a card memory for storing product discount information, and a store with a plurality of products. The system comprises a plurality of cash register stations, each cash register station including an electromagnetic detector for generating first signals corresponding to product pricing and for generating second signals identifying products selected for purchase; a card interface for reading from the card memory of one of the portable of cards; a first processing unit that executes a first program in a first memory to correlate second signals with first signals, a third signal-path between a peripheral device and the first processing unit, a second processing unit, responsive to a signal on the third signal path, that executes a second program in a second memory, to correlate second signals with third signals from the card memory of one of the plurality of card, wherein the first processing unit determines a total amount due by receiving a fourth signal from the second processing unit.

According to yet another aspect of the present invention, there is a method for a system including a plurality of portable cards each having a card memory, and a store having a plurality of products, and a plurality of cash register stations. The method comprises generating first signals corresponding to product pricing and for generating second signals identifying products selected for purchase; reading third signals corresponding to product pricing from the card memory of one of the portable cards; executing a first program in a first memory to correlate second signals with first signals, wherein the method also includes executing a second program in a second memory, to correlate second signals generated in a respective one of the cash register stations, the with third signals read in the respective one of the cash register stations.

According to yet another aspect of the present invention, there is a method for a system including a plurality of portable cards each having a card memory for storing product discount information, and a store with a plurality of products. The method comprises generating first signals corresponding to product pricing; generating second signals identifying products selected for purchase; reading from the card memory of one of the portable of cards; executing a first program in a first memory to correlate second signals with first signals, sending a device signal on a third signal-path between a peripheral device and the first program, executing, responsive to the device signal, a second program in a second memory, to correlate second signals with third signals from the card memory of one of the plurality of card, wherein the step of executing a first program determines a total amount due by receiving a fourth signal from the step of executing a second program.

BRIEF DESCRIPTION OF THE DRAWINGS

FIG. 11 is a diagram of a coupon request message, sent over the computer network.

FIG. 12 is a diagram of a coupon reply message, sent over the computer network.

FIG. 16 represents a table employed by the checkout station to process coupon redemptions.

FIG. 18 represents a table employed by the first preferred embodiment to print product information on a display.

FIG. 35 is a diagram of showing a coupon redemption control table.

FIG. 36 is a diagram showing values for the qualifier type field of the redemption control table shown in FIG. 35.

FIG. 37 is a diagram of showing values for the flag bits field of the redemption control table shown in FIG. 35.

FIG. 38 is a diagram of a showing values for the reward type field of the redemption control table shown in FIG. 35.

The accompanying drawings which are incorporated in and which constitute a part of this specification, illustrate embodiments of the invention and, together with the description, explain the principles of the invention, and additional advantages thereof. Throughout the drawings, corresponding elements are labeled with corresponding reference numbers.

DESCRIPTION OF THE PREFERRED EMBODIMENTS

First Preferred Embodiment

Figure 1:
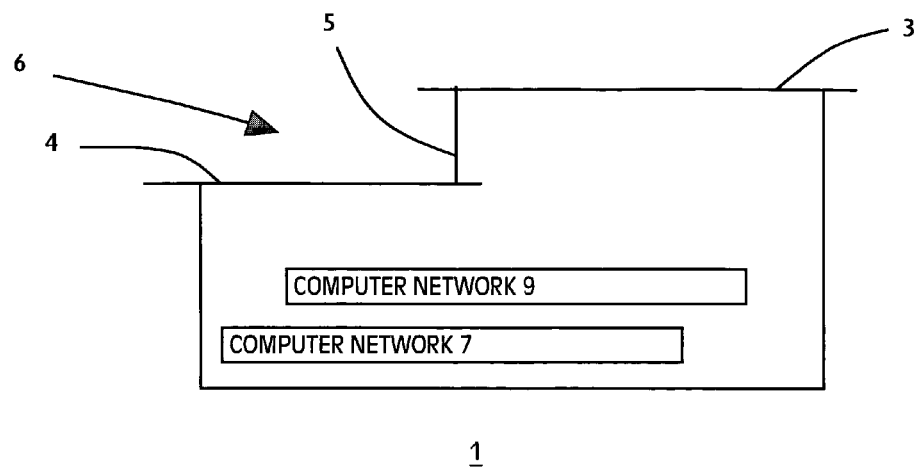
FIG. 1 is a schematic diagram of a retail system in accordance with a first preferred embodiment of the present invention.

FIG. 1 shows a store 1 including roof structure 6, computer network 7 under roof structure 6, and computer network 9 under roof structure 6 in accordance with a first preferred embodiment of the present invention. Roof structure 6 includes roof section 4, window 5 coupled to roof section 4, and roof section 3 coupled to window 5.

Figure 2:
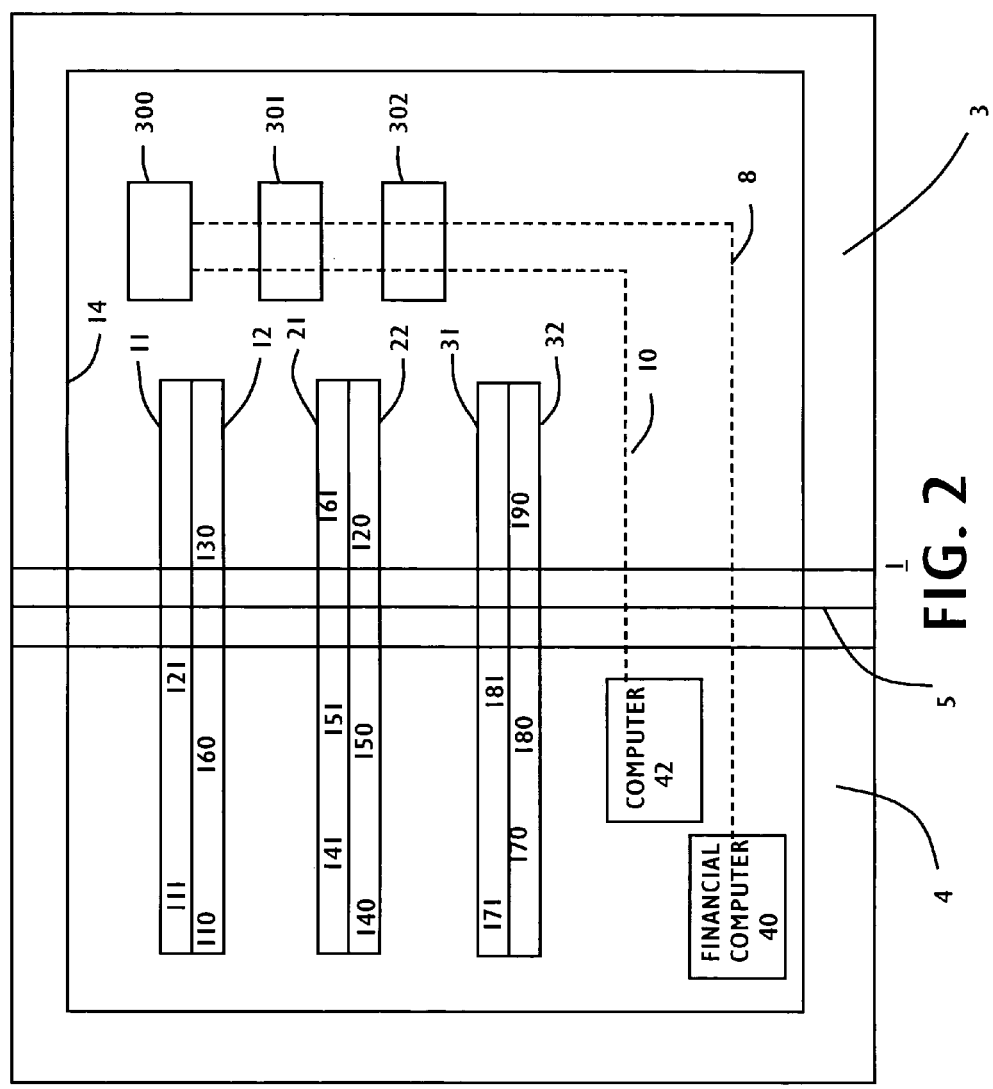
FIG. 2 is a plan view of a retail store in the first preferred embodiment.
Figure 3A:
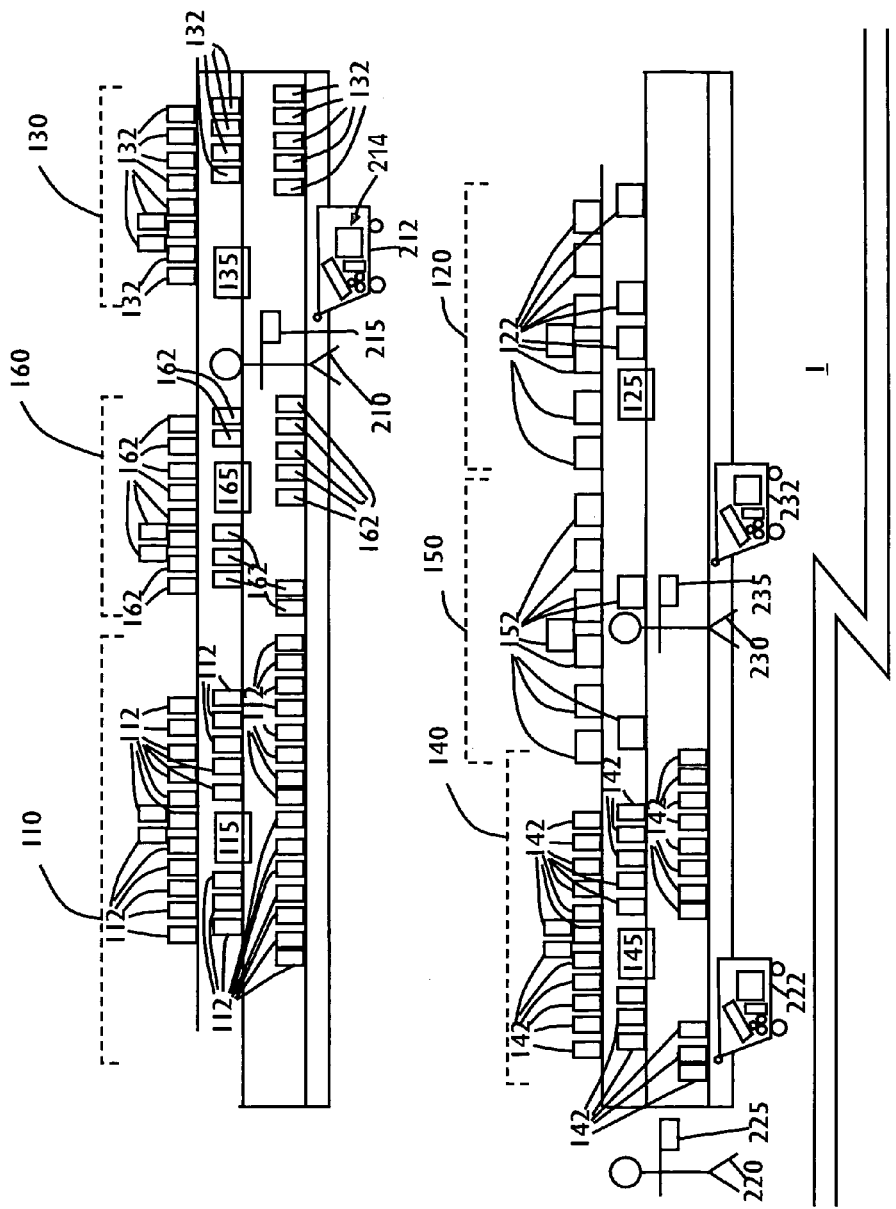
FIGS. 3A and 3B are another type of view of a part of the retail store.
Figure 3B:
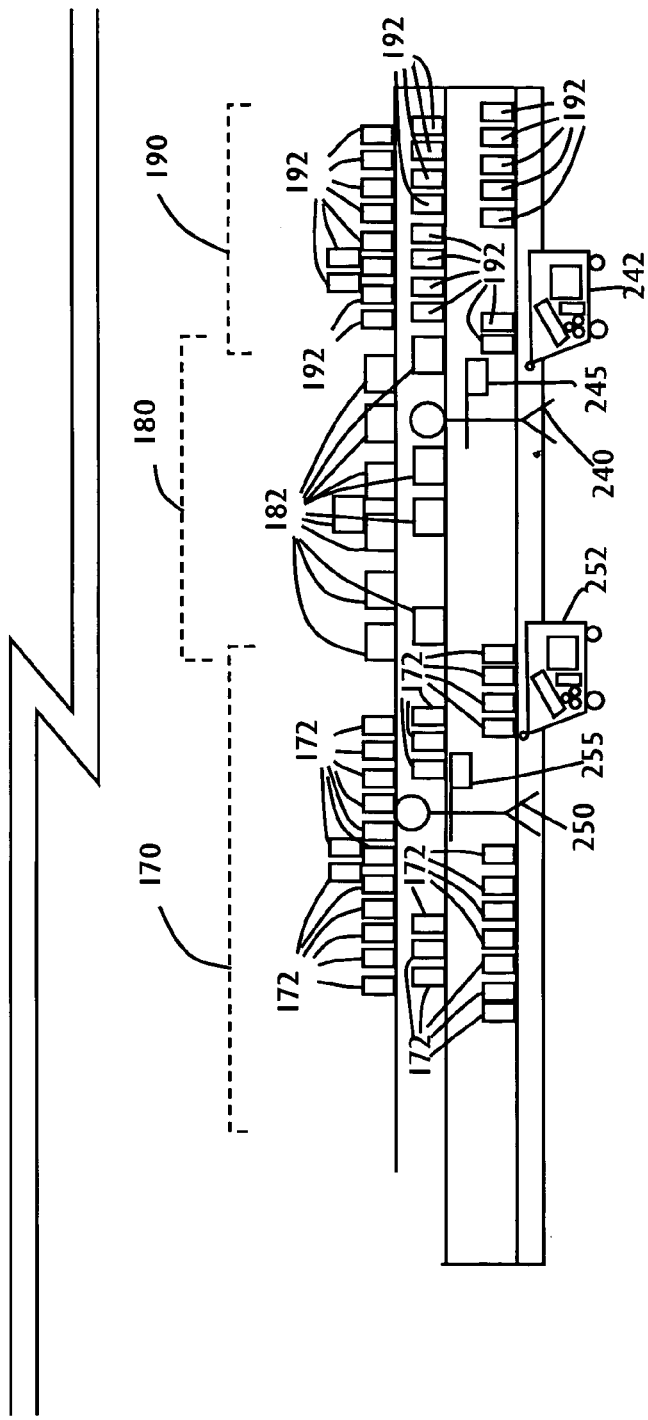

FIG. 2 shows a plan view of store 1. Shelves 11, 12, 21, 22, 31, and 32 include product areas 111, 121, 110, 120, 130, 141, 151, 161, 140, 150, 160, 171, 181, 170, 180, and 190. Each product area includes a plurality of a respective product. Customers shop in store 1, by removing products from the shelves and bringing the products to one of the checkout station 300, 301, or 302. Some computers in checkout stations 300, 301, 302 communicate with financial computer 40 via computer network cable 8. Other computers in checkout stations 300, 301, 302 communicate with computer 42 via computer network cable 10.

FIGS. 3A, 3B, 6A, and 6B are each a partial view of store 1. Customers 210, 220, 230, 240, 250, 270, 280, and 290, shop in store 1. Store 1 has a plurality of product areas, each corresponding to a respective product. Product Area 110 has Delta brand detergent. Product Area 120 has Old World brand pasta. Product Area 130 has Lighthouse brand light bulbs.

Some of the product areas have a respective shelf unit for writing an electronic coupon onto a customer card. Product Area 110 has Shelf unit 115. Product Area 120 has Shelf unit 125. Product Area 130 has Shelf unit 135.

More specifically, Product Area 110 has bottles of detergent 112 grouped together on multiple shelves. Bottles of detergent 112 are contiguously grouped, meaning that no other product is between any two bottles of detergent 112. No other product is between shelf unit 115 and bottles of detergent 112. Shelf unit 115 is on a shelf under some of the bottles 112 and over some of the bottles 112. In other words, Shelf unit 115 is adjacent to bottles 112 and supported by a shelf that is in vertical alignment with some of the bottles 112.

Figure 4A:
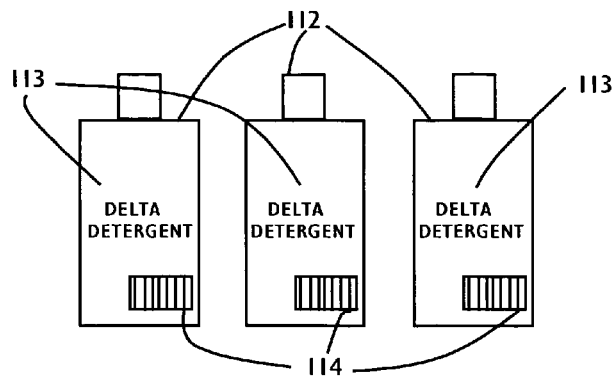
FIGS. 4A, 4B, and 4C are enlarged views of some products shown in FIGS. 3A and 3B.

FIG. 4A shows an enlarged view of some of the bottles of detergent 112. Each bottle of detergent has a common Universal Product Code (UPC) symbol 114. Symbol 114 encodes a 12-digit number that is part of a product identification system documented by the Uniform Code Council, Inc., Dayton, Ohio. In UPC Product Code format, the first digit is a 0, designating a product. The next five digits are a manufacturer ID. The next 5 digits are an item number. The last digit is a check digit.

Each UPC symbol 114 is a group of parallel lines that encodes a number (0 17075 00003 3) that uniquely identifies Delta Detergent. In other words, symbol 114 is different from UPC symbols of units of other products. Each bottle of detergent 112 also has a common character label 113 that verbally describes the product. Character label 113 is "DELTA DETERGENT." Label 113 is different from labels of units of other products.

Figure 4B:
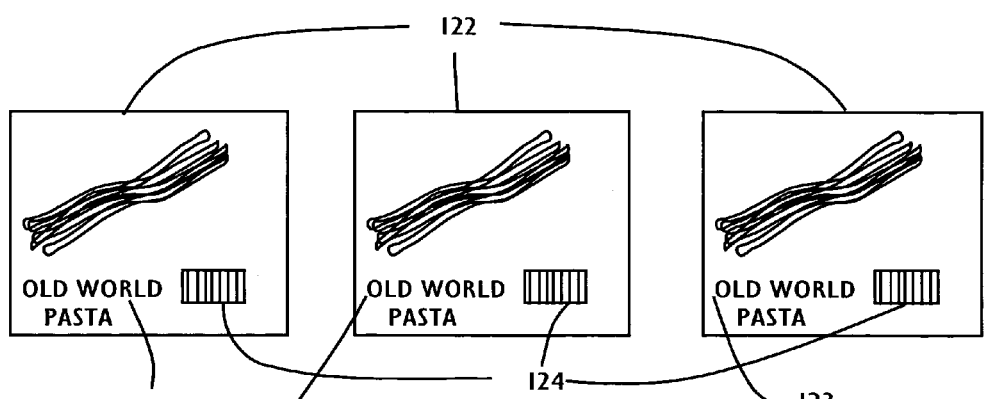

Product Area 120 has boxes of Old World brand pasta 122 contiguously grouped together on multiple shelves. FIG. 4B shows an enlarged view of some of the boxes of pasta 122. Each box of pasta 122 has a common UPC symbol 124, which is a group of parallel lines that encodes a number (0 17031 00005 3) that uniquely identifies Old World pasta. In other words, symbol 124 is different from UPC symbols of units of other products. Each box of pasta 122 also has a common character label 123 that verbally describes the product. Character label 123 is "OLD WORLD PASTA." Label 123 is different from labels of units of other products.

Figure 4C:
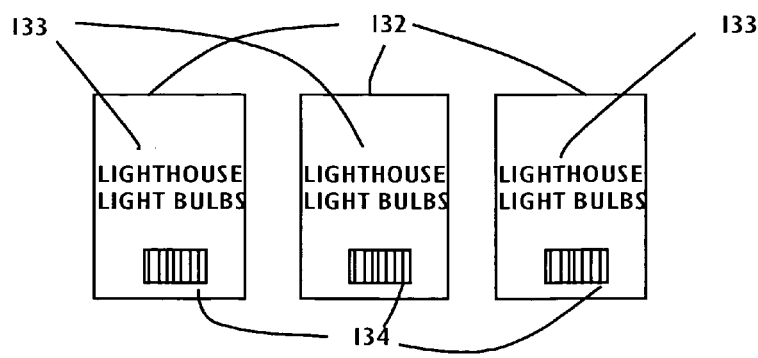

Product Area 130 has boxes of Lighthouse brand light bulbs 132 grouped together on multiple shelves. FIG. 4C shows an enlarged view of some of the boxes of light bulbs 132. Each box of light bulbs 132 has a common UPC symbol 134, which is a group of parallel lines that encode a number (0 17054 1017 6) that uniquely identifies Lighthouse light bulbs. In other words, symbol 134 is different from UPC symbols of other products. Each box 132 also has a common character label 133 that verbally describes the product. Character label 133 is "LIGHTHOUSE LIGHT BULBS." Label 133 is different from labels of other products.

Similarly, other product areas in store 1 each have a set of respective products contiguously grouped together. Respective units of a certain product have a common UPC symbol, different from UPC symbols on units of other products, that uniquely identifies the certain product. Respective units of a certain product have a common label, different from labels on units of other products, that uniquely identifies the certain product. Product area 140 has bottles of ABC brand ketchup 142 contiguously grouped together, and shelf unit 145. Product area 150 has boxes of Fido brand dog food 152 contiguously grouped together, and no shelf unit. Product area 160 has loaves of Boxer brand bread 162 contiguously grouped together, and shelf unit 165. Product area 170 has cartons of Clover brand milk 172 contiguously grouped together, and no shelf unit. Product area 180 has packages of Chicago brand bacon 182, and no shelf unit. Product area of 190 has packages of Clover brand butter 192 contiguously grouped together, and no shelf unit. Product area 111 has boxes of XYZ brand paper napkins contiguously grouped together. Product area 121 has rolls of XYZ brand paper towel contiguously grouped together. Product area 141 has boxes of Wheat brand crackers contiguously grouped together. Product area 151 has Tropical brand canned fruit contiguously grouped together. Product area 161 has V brand canned vegetables contiguously grouped together. Product area 171 has cans of Chicago brand meat contiguously grouped together. Product area 181 has boxes of Mill brand flour contiguously grouped together.

To receive an electronic coupon in the store, a customer inserts her respective card into the shelf unit adjacent to a product the customer wishes to purchase, and the shelf unit then writes an electronic coupon onto the card. In other words, the shelf unit writes an electronic coupon into a memory on the card, in response to a person presenting the card at the shelf unit. More specifically, the shelf unit writes a coupon cell including a coupon ID field.

The customer then removes the product from the shelf and places the removed product into her cart.

Figures 5A, 5B:
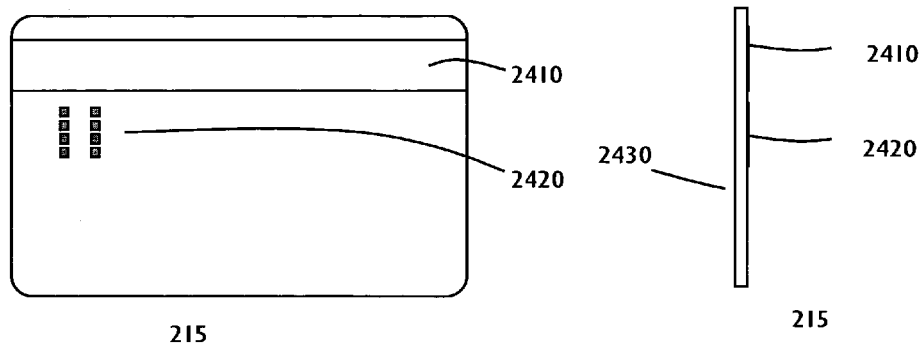
FIG. 5A is a plan view of one of the customer cards shown in FIGS. 3A and 3B.
FIG. 5B is a side view of the card shown in FIG. 5A.

FIG. 5A shows a plan view of customer card 215 carried by customers 210, and FIG. 5B shows a side view of card 215. Card 215 is 8.5 cm by 5.4 cm, the length and width of a typical financial credit card. Card 215 is slightly thicker than a typical financial credit card. Card 215 includes a magnetic stripe 2410, interface contacts 2420 for communication with the checkout station, and embossed area 2430 for displaying the card owner's name. Magnetic stripe 2410 allows a conventional credit card stripe reader to read basic data from the card. Magnetic stripe 2410 is not necessary to the operation of the preferred embodiment of the invention.

Figure 5C:
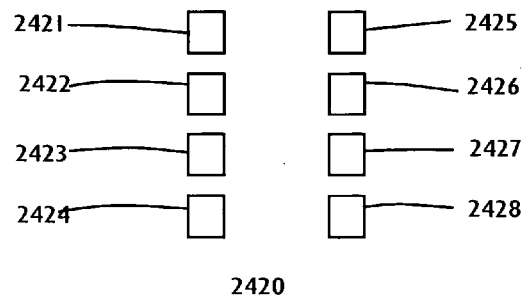
FIG. 5C is an enlarged, partial view of the card shown in FIG. 5A.

FIG. 5C shows interface contacts 2420 in more detail. Interface contacts 2420 are configured in accordance with ISO 7816-2: 1988(E), Identification cards—Integrated circuit (s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 2421 is assigned to VCC (supply voltage), contact 2422 is assigned to RST (reset signal), contact 2423 is assigned to CLK (clock signal), contact 2424 is reserved for future use, contact 2425 is assigned to GND (ground), contact 2426 is assigned to VPP (programming voltage), contact 2427 is assigned to I/O (data input/output), and contact 2428 is reserved for future use. Card 215 communicates with the checkout stations through contact 2427 using a half duplex scheme, meaning that contact 2427 is for communicating data signals either to or from the card.

Figure 6A:
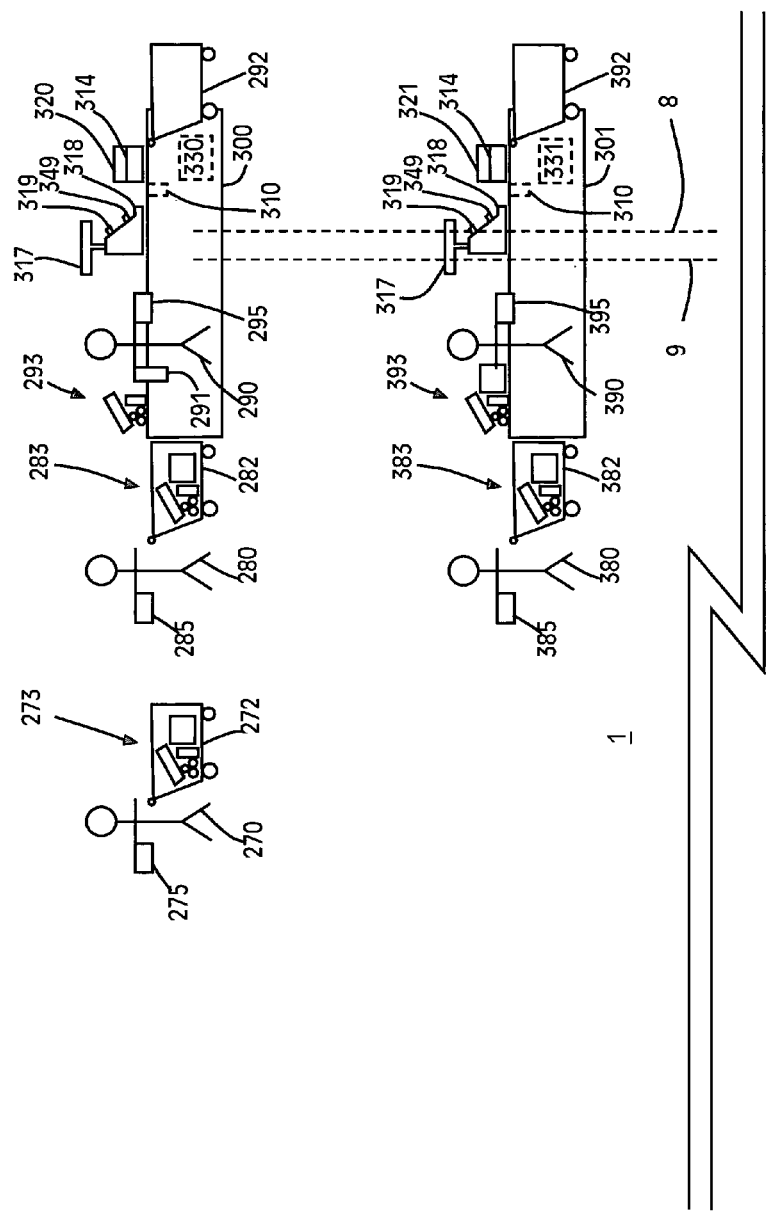
FIGS. 6A and 6B are the other type of view of another part of the retail store.
Figure 6B:
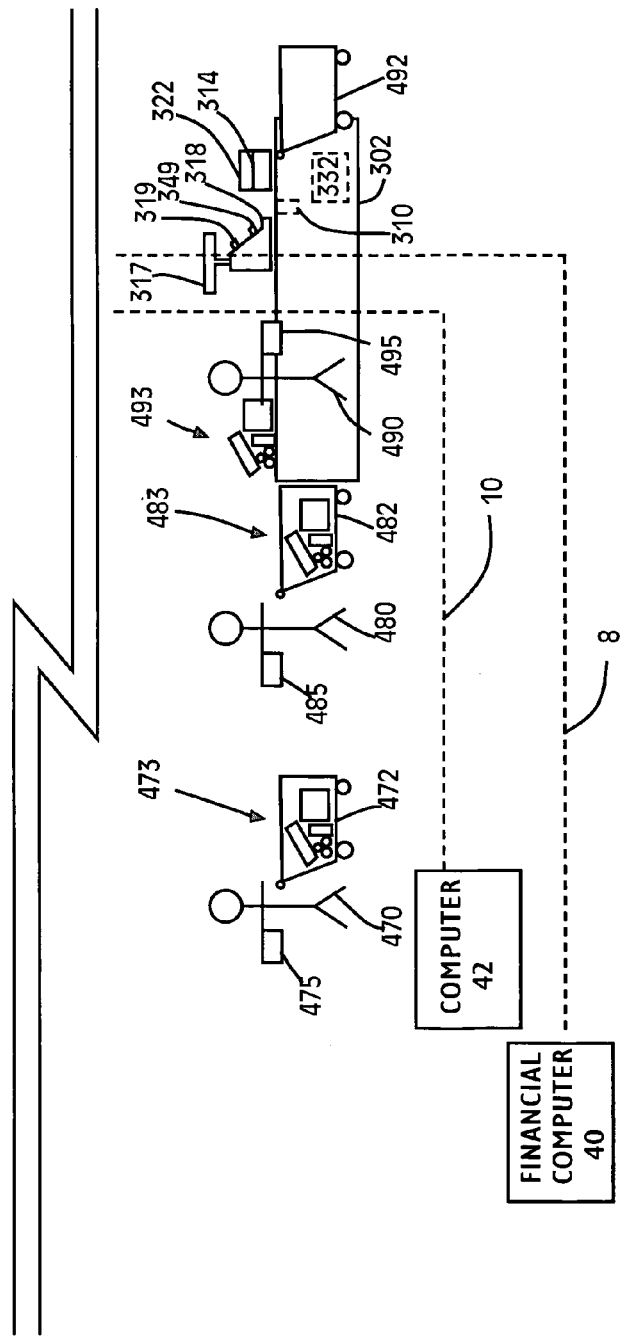

FIGS. 6A and 6B show another part of store 1, including checkout stations 300, 301, and 302. Each checkout station includes a UPC bar code reader that detects an optical (electromagnetic) signal reflected from a UPC symbol. Checkout station 300 includes card interface system 320 having a card interface slot 314, checkout station 301 includes card interface system 321 having a card interface slot 314, and checkout station 302 includes card interface system 322 having a card interface slot 314.

Figure 7:
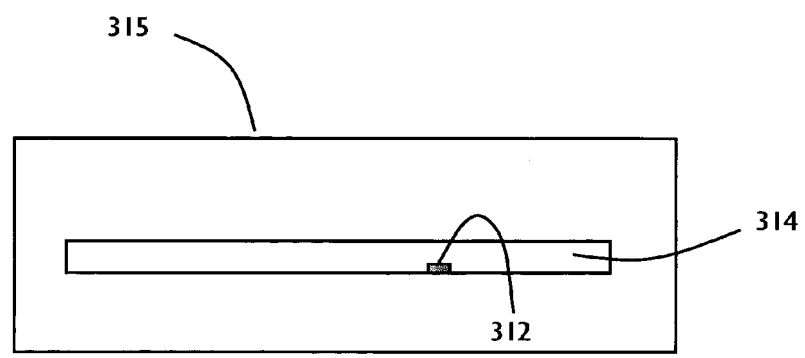
FIG. 7 is a drawing of the card interface shown in FIG. 6A.

FIG. 7 shows card reader/writer 315 including interface slot 314 having a width sufficient to accommodate the width of one of the customer cards. When a customer card is in interface slot 314, conductive contact 312 inside interface slot 314 touches contact 2427 (shown in FIG. 5C) on a customer card. Interface slot 314 has other contacts (not shown) for touching the other card contacts 2420 (shown in FIG. 5C), thereby applying power and a clock from the interface to the card.

An overview of a process performed by the customers and circuitry of the first preferred embodiment will now be described. In this patent application, the word circuitry encompasses dedicated hardware, and/or programmable hardware, such as a central processing unit (CPU) or reconfigurable logic array, in combination with programming data, such as sequentially fetched CPU instructions or programming data for a reconfigurable array.

Figure 25:
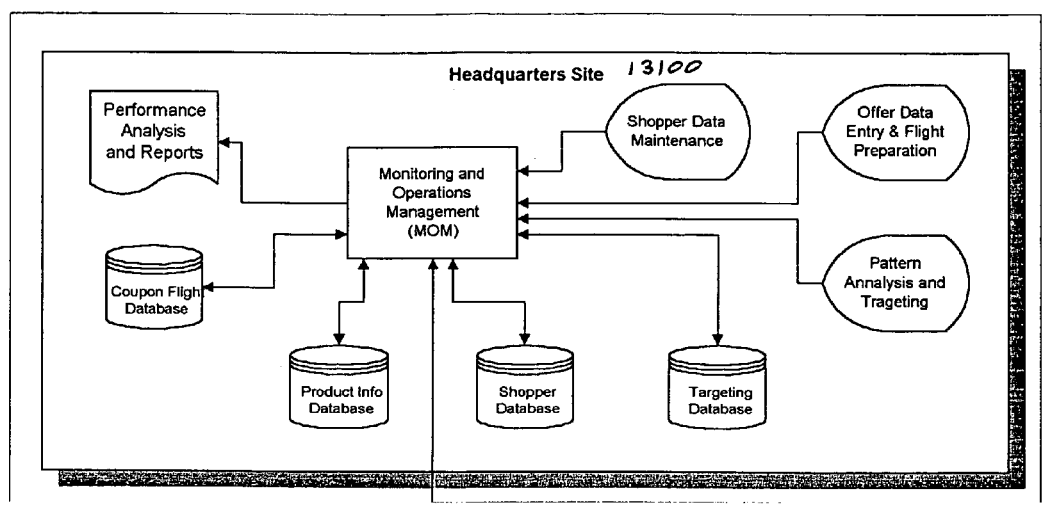
FIG. 25 is a block diagram of a headquarters site that includes a market research center.

Before shopping in the store, each of these customers obtained a customer card. For example, customer 230 obtained customer card 235 from a bank, by completing an application. The application contained questions to collect demographic data, including birth date, income level, past buying patterns, geographic location, size of family, level of education, and job-related data. The bank subsequently wrote customer identification data for customer 230 onto customer card 235, and issued customer card 235 to customer 230, and sent the customer's demographic data to headquarters site 13100 (see FIG. 25) which then stored the demographic data on a magnetic disk in center 13100. Each of customers 210, 220, 240, 250, 270, 280, and 290 obtained a respective customer card in a similar manner.

A customer may start shopping with a card already loaded with electronic coupons. For example, the store may preload new cards as an incentive for completing and submitting a check cashing application. The customer may also have a device at home for loading coupons onto the card, as described in U.S. Pat. No. 5,806,044 issued Sep. 8, 1998 of KEN R. POWELL for SYSTEM AND METHOD FOR DISTRIBUTING COUPONS THROUGH A SYSTEM OF COMPUTER NETWORKS, Ser. No. 08/603,482, filed Feb. 20, 1996, the contents of which is herein incorporated by reference. The customer may also load coupons onto the card from in-store shelf units, as described in copending U.S. patent application of KEN R. POWELL for RETAIL SYSTEM, Ser. No. 08/468,816, filed Jun. 6, 1995, the contents of which is herein incorporated by reference.

Figure 8:
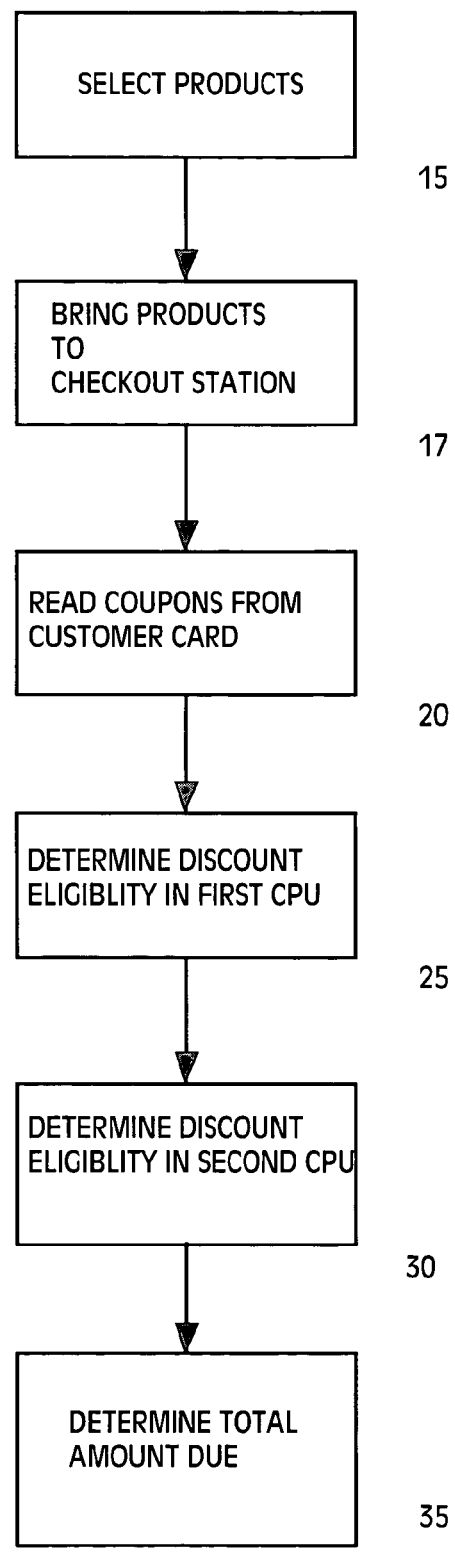
FIG. 8 is a flow chart of a process performed by the first preferred embodiment.

FIG. 8 shows a process performed by the first preferred embodiment. While shopping in store 1, each of customers 210, 220, 230, 240, 250, 270, 280, and 290 carries his or her respective customer card. Customer 210 carries card 215, customer 220 carries card 225, customer 230 carries card 235, customer 240 carries card 245, customer 250 carries card 255, customer 270 carries card 275, customer 280 carries card 285, and customer 290 carries card 295. Each customer tows a shopping cart to hold selected products. Customer 210 tows cart 212, customer 220 tows cart 222, customer 230 tow cart 232, customer 240 tows cart 242, customer 250 tows cart 252, customer 270 tows cart 272, customer 280 tows cart 282, and customer 290 tows cart 292. Each customer removes one or more desired products from a shelf and places the removed product into her cart. (step 15).

Upon completion of shopping, the customer brings selected products from the shelves to checkout station 300, 301, or 302. (step 17).

The customer redeems the electronic coupons by presenting her customer card for insertion into smart card reader/writer 315. For example, referring to FIGS. 3A, 3B, 6A, and 6B, a customer such as customer 290 completes the purchase of her selected products 293 by transferring products 293 from her cart 292 to station 300, and by presenting card 295 for insertion into card interface slot 314; customer 270 completes the purchase of her selected products 273 by transferring products 273 from her cart 272 to station 300, and by presenting card 275; customer 280 completes the purchase of her selected products 283 by transferring products 283 from her cart 282 to station 300, and by presenting card 285; customer 390 completes the purchase of her selected products 393 by transferring products 393 from her cart 392 to station 301, and by presenting card 395; customer 380 completes the purchase of his selected products 383 by transferring products 383 from his cart 382 to station 301, and by presenting card 385; customer 490 completes the purchase of his selected products 493 by transferring products 493 from his cart 492 to station 302, and by presenting card 495; customer 480 completes the purchase of his selected products 483 by transferring products 483 from his cart 482 to station 302, and by presenting card 485; customer 470 completes the purchase of his selected products 473 by transferring products 473 from his cart 472 to station 302, and by presenting card 475. Customer 210 completes the purchase of her selected products 214 by transferring products 214 from her cart 212 to station 300, and by presenting card 215 for insertion into card interface slot 314. It is presently preferred that card insertion occur at the beginning of the checkout transaction, although card insertion could happen later. Card interface system 320 reads the coupon offers from the card. (step 20).

A checkout clerk (not shown) scans each selected product past bar code reader 310, or enters the product selection information manually via keyboard 318. The clerk also scans paper coupons past bar code reader 310, or manually reads the paper coupons and enters the coupon information manually via keyboard 318. A CPU and program in system 330 make a list of the products selected by the customer. The CPU and program in system 330 processes the paper coupon information in the context of the selected products to determine discount eligibility (step 25).

A CPU and program in system 320 are also responsive to products selected by the customer. The CPU and program in system 320 make a list of the products selected by the customer. The CPU and program in system 320 perform electronic coupon redemption, by processing the selected products in the context of the coupon information from the customer's card to determine discount eligibility (step 30).

Redemption information is printed on the customer's paper receipt. At the conclusion of the transaction the shelf unit coupons on the card are voided and the clerk is notified to remove the customer's card from slot 314 and return it to the customer. In response to the results of steps 25 and 30, the checkout station determines a total amount due and prints the total amount due on display 317 and on the customer's paper receipt. (step 35).

Figure 9:
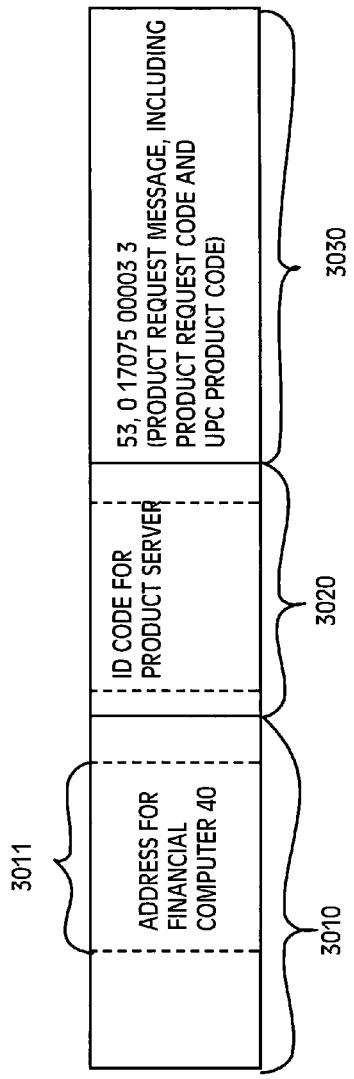
FIG. 9 is a diagram of a product request message, sent over a computer network.

FIGS. 9, 10, 11, and 12 show messages processed by cash register system 330 in checkout station 300, to perform the processing of step 25 of FIG. 8. FIG. 9 shows a message 3002 sent by system 330 to financial computer 40, via network cable 8, in response to receiving a product signal from bar code reader 310. Message 3002 is a request for product information for the most recently scanned product 293.

Figure 10:
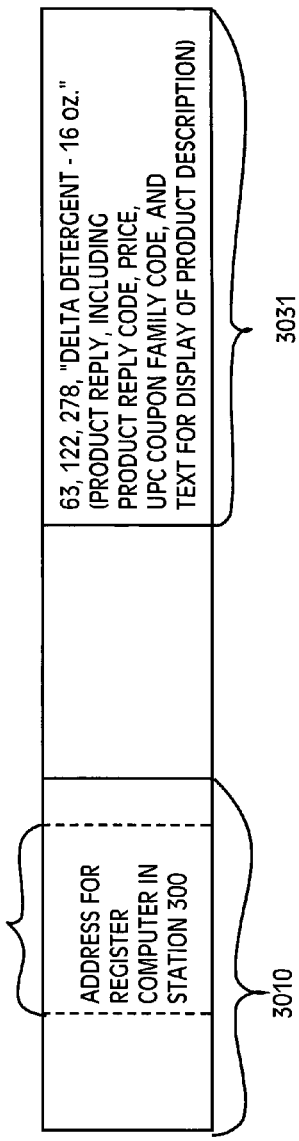
FIG. 10 is a diagram of a product reply message, sent over the computer network.

FIG. 10 shows a message 3004 sent from financial computer 40 to system 330, via network cable 8. Financial computer 40 sends a message 3004 in response to receiving a message 3002.

After system 330 determines a basic price for the product by processing a message 3004, system 330 displays the description of the product and product price on display 317. Thus, system 330 acts to detect a product scanned by bar code reader 310 and determine a basic price for the product by sending a message 3002 to financial computer 40 and receiving a message 3004 from financial computer 40. System 330 scans and processes each product 293 in a similar manner.

System 330 may receive paper (hard copy) coupons being redeemed by customers. System 330 may receive a paper coupon, such as paper coupon 291 held by customer 290, by presenting the paper coupon to bar code reader 310. In other words, checkout system 330 may process paper coupon 291 (a reflective substrate encoding a coupon) by a detecting light signal, using bar-code-reader 310, reflected from the paper substrate, to generate a signal corresponding to product pricing.

FIG. 11 shows a message 3006 sent from system 330 to financial computer 40 via network cable 8 in response to receiving a coupon signal, from either bar code reader 310 or keyboard 318.

FIG. 12 shows a message 3008 sent from financial computer 40 to checkout system 330, via network cable 8. Financial computer 40 sends a message 3008 in response to receiving a message 3006.

System 330 processes discount reply messages 3008, and discount tender signals generated by card interface system 320, to deduct discounts from the basic price and determine a total amount due. System 330 displays the total amount due on display 317.

Figure 13:
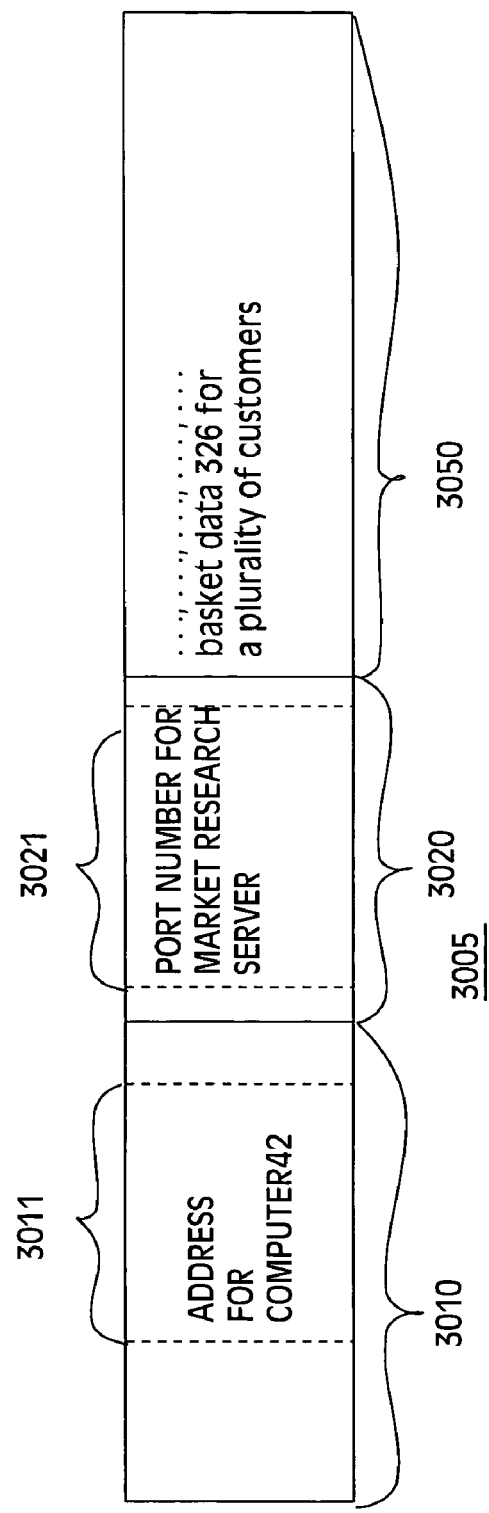
FIG. 13 is a diagram of a redemption report message, sent over another computer network.

FIG. 13 shows a message 3005 sent by system 320, via network cable 10, to computer 42. Message 3005 includes basket data 326 for a plurality of customers. For example, basket data 326 in message 3005 includes an identification code for customer 210 and a list of products purchased by customer 210 in a checkout transaction.

Similarly, customer 390 in FIG. 6A will complete the purchase of her selected products 393 by transferring products 393 from her cart 392 to station 301, and by presenting card 395 for insertion into interface slot 314 of station 301; and the clerk will scan each selected product 393 past UPC bar code reader 310. Customer 490 in FIG. 6B will complete the purchase of his selected products 493 by transferring products 493 from his cart 422 to station 302, and by presenting card 495 for insertion into interface slot 314 of station 302; and the clerk (not shown) will scan each selected product 493 past UPC bar code reader 310 of station 302.

The preferred embodiments of the present invention will now be described in more detail.

Figure 14:
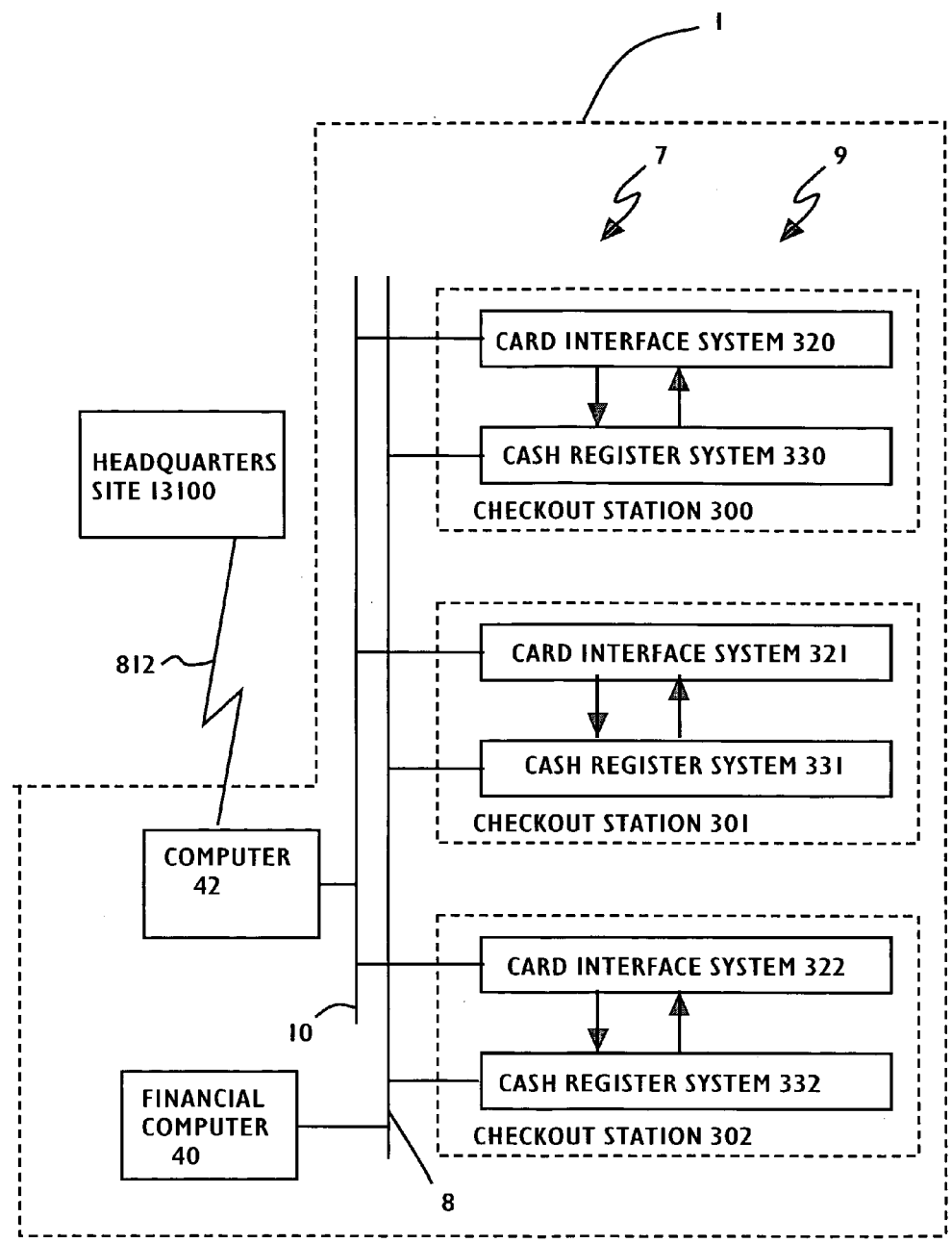
FIG. 14 is a block diagram of the first preferred computer system.

FIG. 14 shows another aspect of the first preferred system. Local Area Network (LAN) 7 in store 1 includes ethernet cable 8 and 4 computers: financial computer 40, cash register system 330, cash register system 331, and cash register system 332. Cash register system 330 is in checkout station 300, cash register system 331 is in checkout station 301, and cash register system 332 is in checkout station 302. Each of computer 40 and systems 330, 331, and 332 has a respective network address uniquely identifying it in network 7. Each of computer 40 and systems 330, 331, and 332 has a respective network interface card for recognizing when a packet containing its address is sent over cable 8, temporarily storing such a packet, and alerting the associated CPU when such a packet is recognized.

Computer 40 and systems 330, 331, and 332 communicate by sending data packets in a format conforming to the communication protocol of network 7, meaning, for example, that the packet has a destination address field offset a certain number of bits from the start of the packet, and that the destination address field has a certain number of bits. Each packet is essentially a type of signal.

Local Area Network (LAN) 9 in store 1 includes ethernet cable 10 and 4 computers: computer 42, card interface system 320, card interface system 321, and card interface system 322. Card interface system 320 is in checkout station 300, card interface 321 is in checkout station 301, and card interface system 322 is in checkout station 302. Each of computer 42 and systems 320, 321, and 322 has a respective network address uniquely identifying the computer in network 9. Each of computer 42 and systems 320, 321, and 322 has a respective network interface card for recognizing when a packet containing the computer's address is sent over cable 10, temporarily storing such a packet, and alerting the associated CPU when such a packet is recognized.

Computer 42 and systems 320, 321, and 322 communicate with each other by sending data packets in a format conforming to the communication protocol of network 9, meaning, for example, that the packet has a destination address field offset a certain number of bits from the start of the packet, and that the destination address field has a certain number of bits. Each packet is essentially a type of signal.

System 320 compiles basket data 326, including customer identification data, from a plurality of cards, and sends basket data 326 to headquarters site 13100 (FIG. 33), via computer 42, a modem, and telephone signal path 812 (FIG. 14). Site 13100 uses the customer identification data to access the corresponding demographic data, thereby providing manufacturers with information about customer buying patterns. Headquarters site 13100 is located outside of store 1. Headquarters site 13100 includes a market research center.

In FIG. 9, header 3010 of message 3002 includes a destination address field 3011 identifying financial computer 40 on network 7. Header 3010 contains other fields, including a field containing the address of the sender of packet 3002, and a field containing data correction bits. Destination field 3020 contains an identification code for a certain process executing on financial computer 40. Field 3030 includes the number 53, which is a code indicating that information for a product is being requested. Following the product request code 53 is a UPC product code identifying the product. Message 3002 is a request for information about Delta Detergent, because the UPC product code is 0 17075 00003 3.

In FIG. 10, header 3010 of message 3004 includes a destination address field 3011 identifying the cash register system in check out station 300. Field 3031 includes the number 63, which is a code indicating a reply to a product request message. Following the reply code 63 is the price of the product (122) in cents, and the three-digit UPC coupon family code (278) assigned to the product, and a textual description of a product corresponding to the UPC product code received in product request message.

In FIG. 11, header 3010 of message 3006 includes destination address field 3011 identifying financial computer 40. Destination field 3020 contains an identification code for another process executing on financial computer 40. Field 3040 includes the number 55, which is a code indicating that information for a UPC coupon code is being requested. Following the discount request code 55 is a UPC coupon code.

In FIG. 12, header 3011 of message 3008 includes a destination address field 3011 identifying the register system in station 300. Field 3041 includes the number 65, which is a code indicating that this message is a reply to a discount request message. Following the code 65 is the value of the coupon in cents, which in this case is thirty cents.

Figure 15:
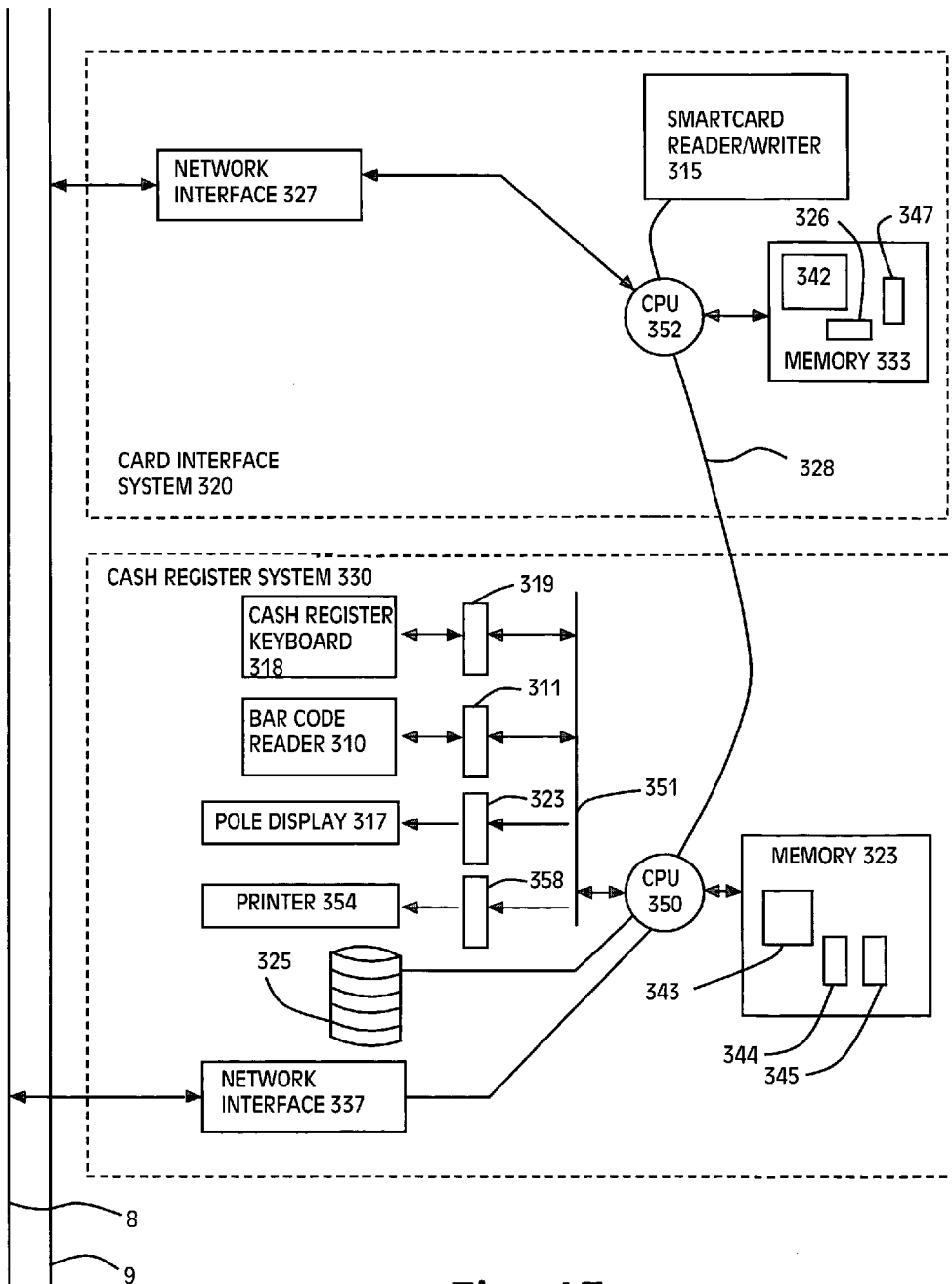
FIG. 15 is a block diagram of a checkout station in the first preferred embodiment.

FIG. 15 is a block diagram of checkout station 300 including cash register system 330 and card interface system 320. Cash register system 330 includes an IBM 4680-4690 Point of Sale System. Cash register keyboard 318 allows manual entry of alpha-numeric-data. Disk 325 provides long term storage. Bar code reader 310 generates a bar code signal, and sends the bar code signal to CPU 350 via bus 351. Poll display 317 displays product data in response to signals from CPU 350. CPU 350 executes instructions in random access, addressable memory 323.

Each of bus interfaces 323 and 311 recognizes a respective bus address on RS-485 serial bus 351. Interface 323 recognizes a bus address for poll display 317, and interface 311 recognizes a bus address for bar code reader 310. CPU 350 communicates with a peripheral device by first sending the device's bus address on bus 351. For example, to write data to pole display 317, CPU 350 sends the bus address of pole display 317 via bus 351 and then sends data to be written via bus 351. Pole display 317 acts to receive a command for writing the data in response to a recognition of pole display 317 bus address by interface 323.

To read data from peripheral devices, CPU 350 polls each input device by sending respective device bus addresses on bus 351. For example, if bar code reader 310 responds to a poll and sends a bar code having a first digit equal to 5, meaning a code for a coupon, CPU 350 sends a message 3006 to financial computer 40 via network interface 337. Otherwise, if the first digit is not 5, meaning a code for a product, CPU 350 sends a message 3002 to financial computer 40 via network interface 337.

CPU 350 in system 330 communicates with CPU 352 in system 320 via RS232 line 328, as discussed in more detail below.

In card interface system 320, CPU 352 executes program 342 in memory 333. CPU 352 and program 342 act to receive electronic coupons from a customer card, via reader/writer 315. Memory 333 also includes a redemption control table 347, which enables CPU 352 to determine if a product has a corresponding electronic coupon offer.

FIG. 16 is a simplified diagram of redemption control table 347. Each row in FIG. 16 represents an entry in redemption control table 347, and each of the 4 columns shown represents an entry field. The first field is a coupon identifier (ID), the second field is a UPC product code corresponding to the coupon ID. Redemption control table 347 is sorted by UPC product code.

The third field is a reward type. A reward type of 2 represents a percent off coupon, and a reward type of 0 represents a cents off coupon.

The fourth field in FIG. 16 is the reward quantity.

The first entry shows a reward quantity of 20 percent, as the reward type field is 2. The second entry shows a reward quantity of 75 cents off as the reward type is 0. The third entry shows a reward of 50 cents off, as the reward type is 0.

Checkout stations 301 and 302 each have the same capabilities and hardware as checkout station 300, cash register systems 331 and 332 each have the same capabilities and hardware as cash register system 330, and card interface systems 321 and 322 each have the same capabilities and hardware as card interface system 320, except that system 321 has a respective network interface card for recognizing the network 9 address of system 321, computer 331 has a respective network interface card for recognizing the network 7 address of computer 331, system 322 has a respective network interface card for recognizing the network 9 address of system 322, and computer 332 has a respective network interface card for recognizing the network 7 address of computer 332.

Figure 17:
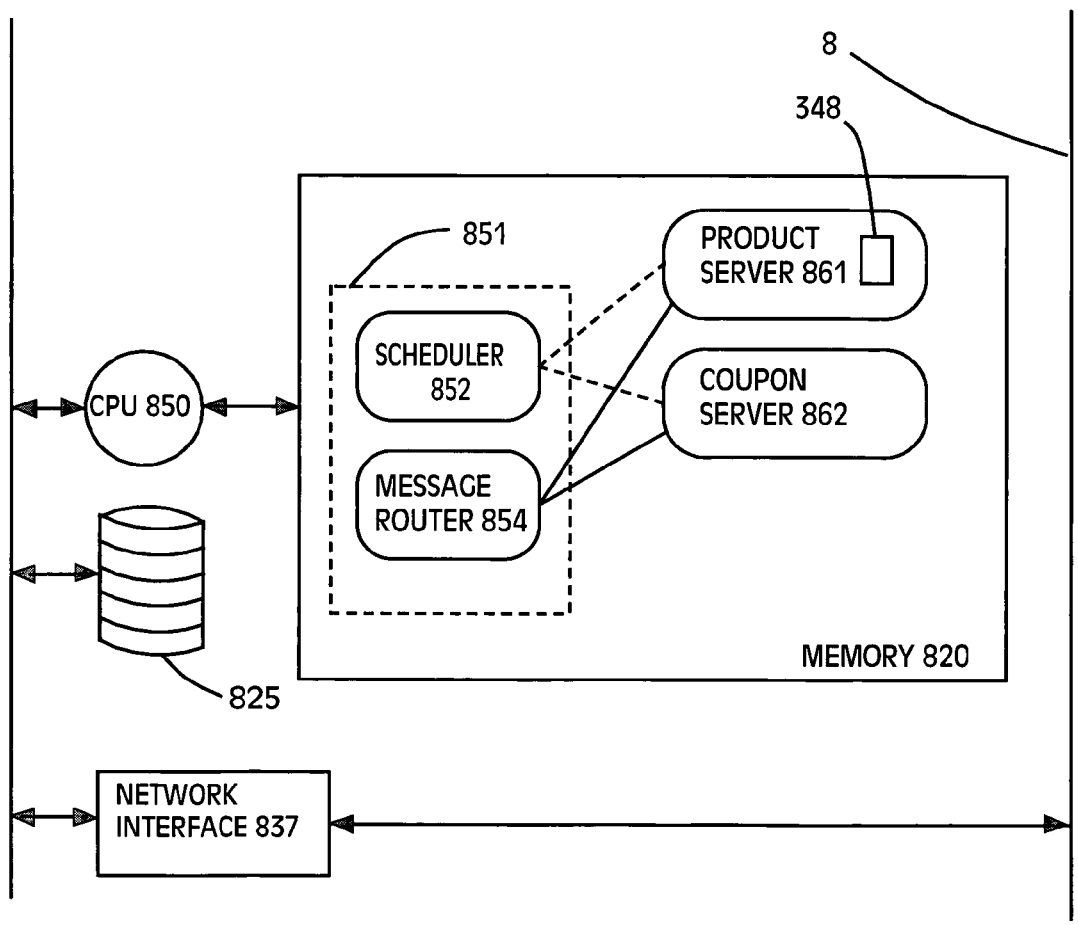
FIG. 17 is a block diagram of the in-store financial computer shown in FIG. 2.

FIG. 17 shows a block diagram of financial computer 40, including CPU 850, memory 820, storage disk 825, and network interface card 837. CPU 850 executes operating system 851. CPU 850 also executes product server 861 and coupon server 862, which are each application processes. CPU 850 executes scheduler 852 in operating system 851 to run servers 861 and 862 in separate time slices.

CPU 850 sends and receives messages through network cable 8 and network interface card 837. Message router 854 reads destination field 3020 and gives the message to the application process associated with destination field 3020. In response, an application process can cause a message to be sent over network interface card 837 and cable 8.

Product server 861 includes a table for translating a UPC product code into a three-digit UPC coupon family ID code, and translating a UPC product code into a retail price for the product.

Product server 861 also includes UPC code-product description table 348, shown in FIG. 18. Each row in FIG. 18 represents an entry in table 348, and each of the two columns represents an entry field. The first field is a UPC product code and the second field is an textual description of a product corresponding to the UPC product code in the entry.

Coupon server 862 includes a table for translating the two-digit value code field, in a UPC coupon code, into a value amount.

Figures 19, 20:
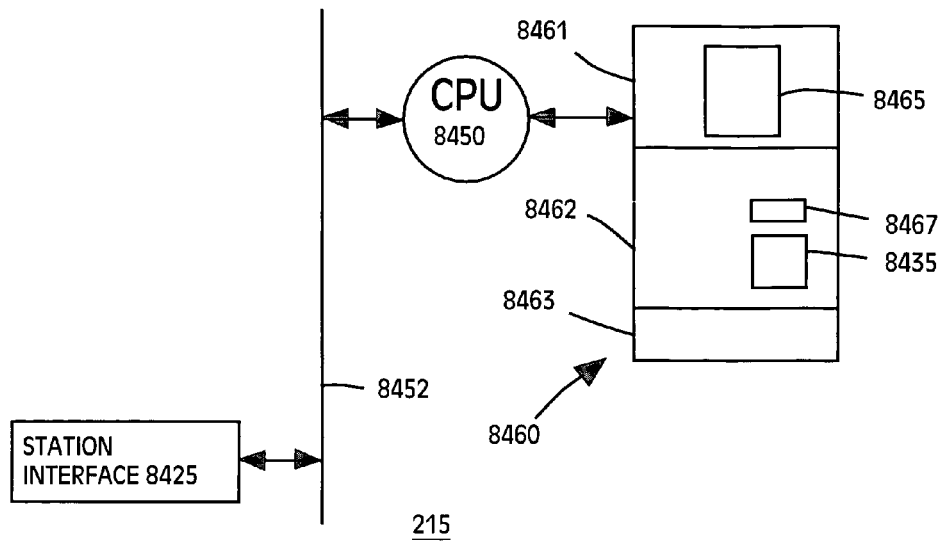
FIG. 19 is a block diagram of a customer card.
FIG. 20 is a diagram of some memory contents of a customer card.

FIG. 19 is a block diagram of customer card 215, including CPU 8450, and memory 8460. Random access memory 8460 includes three addressable segments: nonvolatile read only memory (ROM) 8461; nonvolatile, electrically erasable memory (EEPROM) 8462; and memory 8463 for temporary storage. Station interface 8425 includes a serial to parallel converter for transferring data signals between contact 2427 and CPU 8450 over parallel bus 8452. ROM 8461 stores a program 8465 executed by CPU 8450. EEPROM 8462 stores customer card identification data 8467. Customer card identification data 8467 is a 6 byte field that uniquely identifies the card. For example, identification data 8467 in customer card 235 uniquely identifies the card held by customer 230.

EEPROM 8462 also stores coupons (product pricing data) received from one or more coupon dispensing devices. This product data includes a list of product discounts 8435. When a customer inserts a customer card into a coupon dispensing device, CPU 8450 receives a coupon code for the product from the device and adds the code to the list.

FIG. 20 shows coupon table 8435, which is in a data structure within other data structures in EEPROM 8462 of customer card 215. Each row in FIG. 20 represents an entry in table 8435. An entry is called a "coupon cell." Each of the two columns represents a field within each cell. The first field represented by the left column, is a 4 hexadecimal digit coupon number. Table 8435 has three entries, reflecting the fact that customer 210 has received three electronic coupons from coupon dispensing devices. The entry having the coupon number 1317 corresponds to a coupon for purchase of a box of Old World Pasta 122. The entry having the coupon number 0054 corresponds to a coupon for purchase of a box of Lighthouse Light Bulbs 134. The entry having the number 3656 corresponds to a coupon for purchase of detergent bottles 112.

The second field in table 8435, represented by the right column shown in FIG. 20, is a dispensed count received from a dispensing unit. Processing of this dispensed count is a subject of copending application of KEN R. POWELL, KEVIN W. HARTLEY, THOMAS M. HINTZ, ELEANOR B. MAXWELL, and COREY C. SNOOK for SYSTEM AND METHOD EMPLOYING PORTABLE CARDS TO MONITOR A COMMERCIAL SYSTEM, filed concurrently with the instant application, the contents of which is herein incorporated by reference.

Each of the customer cards has the same hardware structure as customer card 215.

Figure 21:
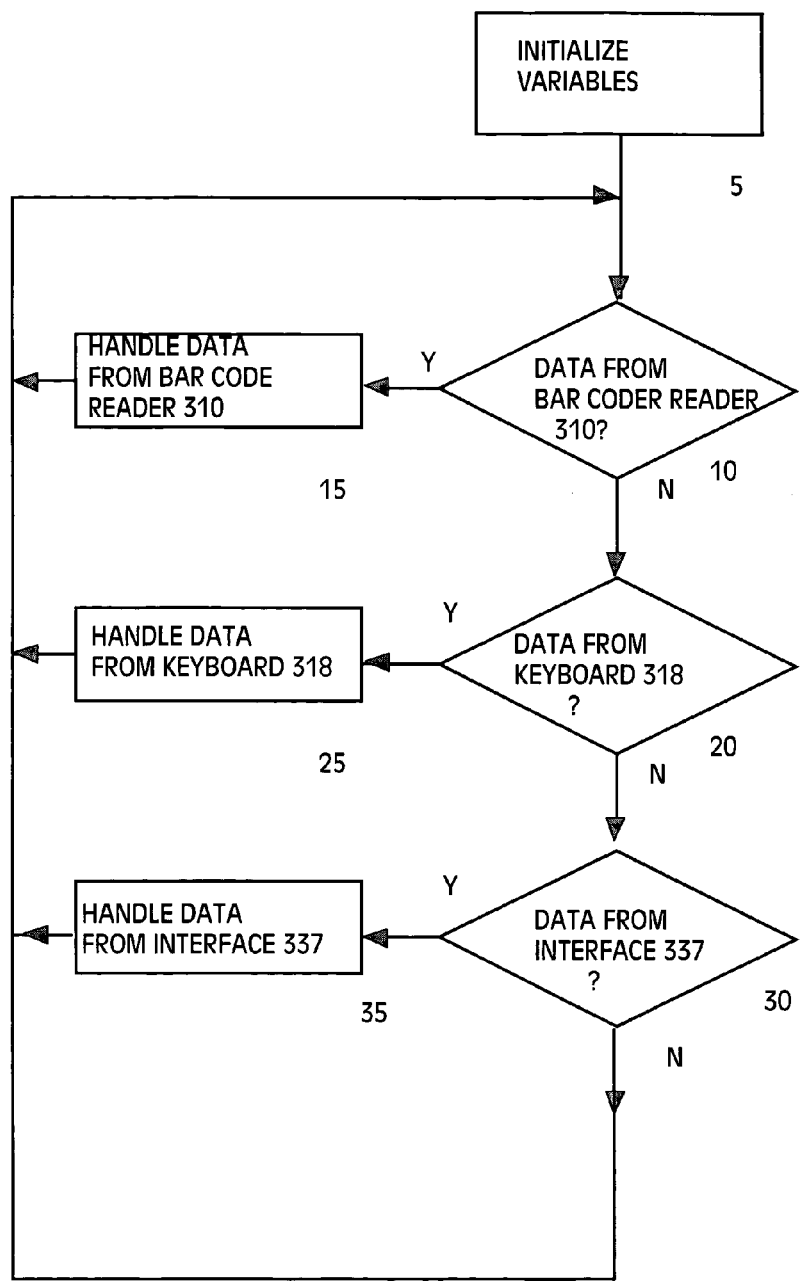
FIG. 21 is a flow chart of a processing performed by a part of the checkout station.

FIG. 21 represents a basic process performed by CPU 350 and program 343. To prepare for processing a new customer, CPU 350 initializes various customer lists, including a list of products selected by the customer. (step 5). CPU 350 polls the various peripheral devices to receive any input data. CPU 350 polls bar code reader 310 by sending the bus address of bar code reader 310 on bus 351. CPU 350 determines whether bar code reader 310 responds to the poll. (step 10). If bar code reader 310 responds to the poll, CPU 350 passes control to a subprogram of program 343 to handle data from bar code reader 310. (step 15).

If bar code reader 310 does not respond to the poll, CPU 350 polls keyboard 318 by sending the bus address of keyboard of 318 over bus 351. CPU 350 determines whether CPU 350 receives a response to the poll of keyboard 318. (step 20). If CPU 350 receives a response to the poll of keyboard 318, CPU 350 passes control to a subprogram of program of 343 for handling input from keyboard 318. (step 25).

CPU 350 determines whether network interface 337 has data. (step 30). If interface 337 has data, CPU 350 passes control to a subprogram of program 343 for handling data from network interface 337. (step 35).

Figure 22:
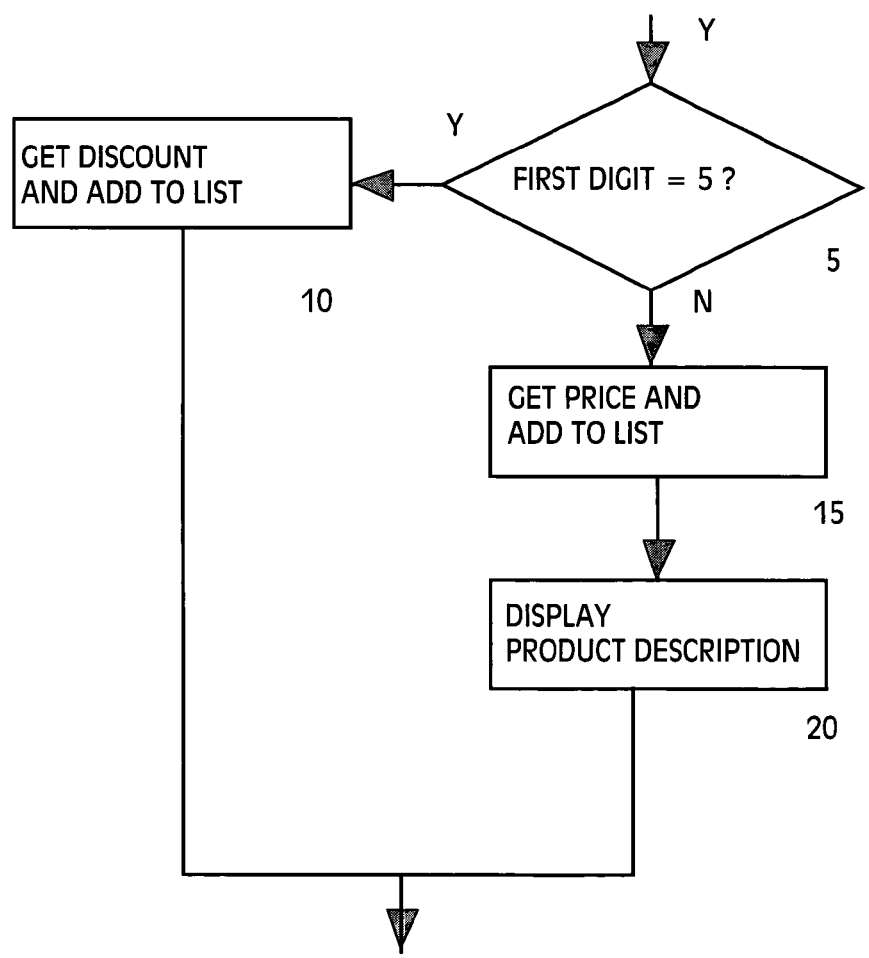
FIG. 22 is a flow chart of a processing performed by a part of the checkout station.

FIG. 22 shows processing of step 15 of FIG. 21 in more detail. When the clerk (not shown) moves an product past UPC reader 310, UPC reader 310 detects the bar code on the product and sends the bar code to CPU 350. If a bar code has been received and the first digit is a 5 (step 5), CPU 350 sends a message 3006 (see FIG. 11) and receives a message 3008 (see FIG. 12) to get the discount corresponding to the UPC coupon code. CPU 350 then makes a record including the coupon and the discount amount, and adds this record to a temporary UPC coupon list 344 in memory 323 (step 10).

If the first digit is not a 5, meaning that the code is a UPC product code, CPU 350 gets the price of the product, the UPC coupon family code of the product, and the textual description of the product. (step 15). CPU 350 then sends a signal encoding the textual description of the product to display 317, and display 317 generates a human readable output describing the product. (step 20).

Figure 23:
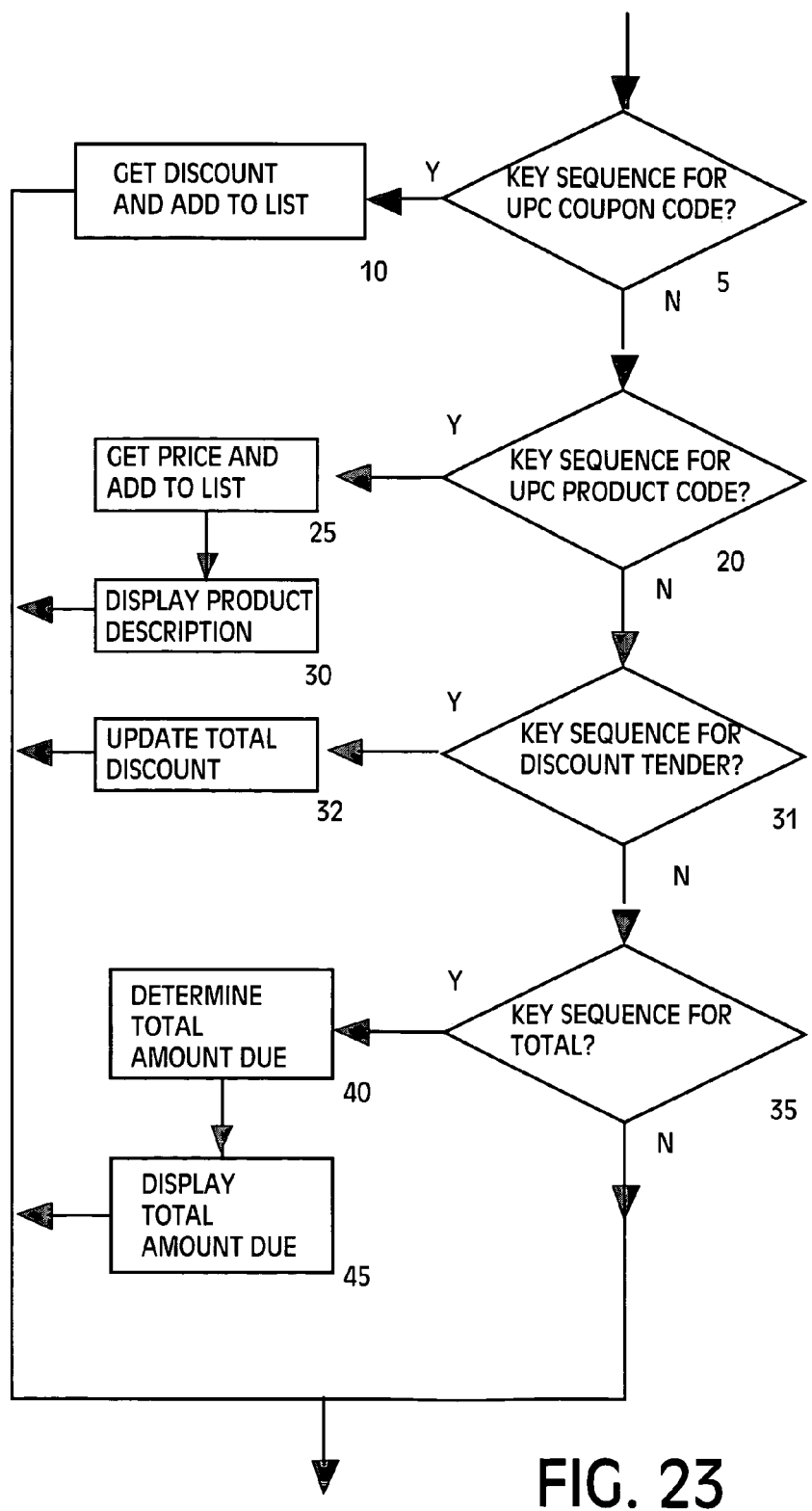
FIG. 23 is a flow chart of a processing performed by a part of the checkout station.

FIG. 23 shows a processing of step 25 of FIG. 21 in more detail. If the clerk enters a key sequence for processing a coupon code, CPU 350 sends a message 3006 (see FIG. 11) and receives a message 3008 (see FIG. 12) to get the discount corresponding to the UPC coupon code. CPU 350 then makes a record including the coupon and the discount amount, and adds this record to the UPC coupon list 344 in memory 20 (step 10).

If the clerk enters a key sequence for entering a UPC product code (step 15), CPU 350 gets the price of the product, the UPC coupon family code of the product, and the textual description of the product. (step 25). CPU 350 then sends a signal encoding the textual description of the product to display 317, and display 317 generates a human readable output describing the product (step 30).

CPU 350 processes each entry in product list 345. If a product in list 345 has a corresponding UPC coupon in list 344, CPU 350 adds the coupon's discount value to a total discount amount, to offset a subsequently calculated amount due. A product corresponds to a coupon if the five-digit manufacturer ID in the UPC product code equals the five-digit manufacturer ID in the UPC coupon code, and the three-digit coupon family code for the product (received in message 3004) corresponds to the three-digit family code of the coupon. These two family codes correspond if they are equal or if the coupon family code is a summary code that matches certain digits of the product's coupon family code, as described more fully in the UPC Coupon Code Guidelines Manual, reprinted October 1994, from the Uniform Code Council, Inc., Dayton, Ohio.

If the clerk enters a key sequence for a discount tender (step 31), CPU 350 adds the value of the tender to a total discount amount, to offset a subsequently calculated amount due (step 32).

When the clerk activates the TOTAL button 349 (step 35), CPU 350 determines the total amount due for the checkout transaction, by subtracting the total discount amounts from the results of a total product price calculation. (step 40). CPU 350 then displays the resulting total amount due on display 317 (step 45).

Figure 24:
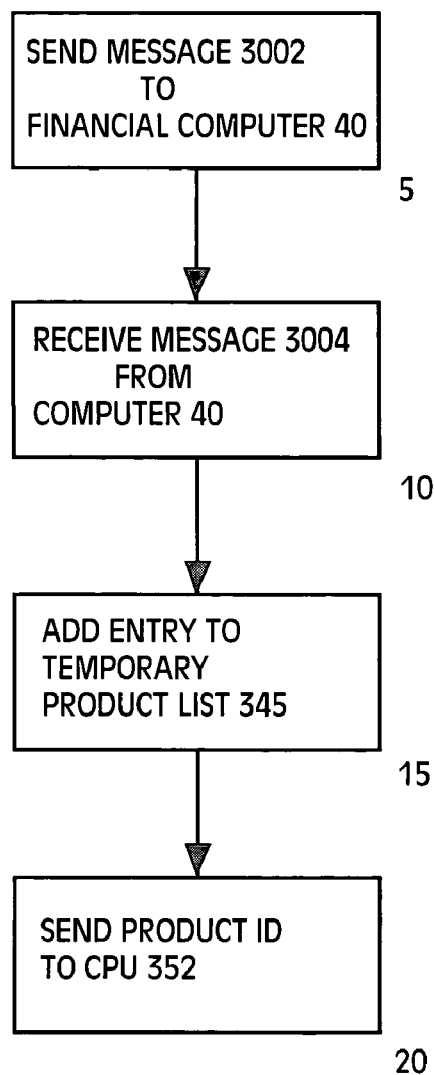
FIG. 24 is a flow chart of a processing performed by a part of the checkout station.

FIG. 24 shows a processing performed by step 15 of FIG. 22 and step 25 of FIG. 23. CPU 350 sends a message 3002 (see FIG. 9) to financial computer 40. (step 5). CPU 350 receives a message 3004 (see FIG. 10) from computer 40 to get the price of the product, the UPC coupon family code of the product, and the textual description of the product. (step 10). CPU 350 makes a record including the product code, the product price, and the UPC coupon family code, and adds this record to a temporary product list 345 in memory 323 (step 15). CPU 350 sends a product message including the UPC product code to CPU 352 via RS232 line 328. (step 20).

It is presently preferred that sending of messages to CPU 352, and processing of messages from CPU 352, be implemented by customizing system 330 with a "user exits," which are a standardized mechanism by which the IBM 4860-4690 system calls custom routines, as described in the IBM 4680-4690 Supermarket Application: Programming Guide, SC30-3634, Third Edition (January 1997). Some exits employed in this customization may include TSUPEC2–After a Customer Checkout Transaction is Completed, TSUPEC7—After Opening All Files, TSUPEC14—After Reading the Keyboard/Scanner, and TSUPEC23—Before Writing a Line to the Display.

Some processing performed by CPU 352, executing program 342, will now be described in more detail. CPU 352 communicates with a card in interface slot 314 through smart card reader/writer 315. A switch (not shown) in interface slot 314 alerts reader/writer 315, which alerts CPU 352, that a card has been inserted into the slot. Subsequently, CPU 352 causes smart card reader/writer 315 to reset the card. The card then answers the reset by sending an "answer to reset" data block in accordance with the ISO standard ISO 7816-3: 1989 (E). CPU 352 then reads a customer card ID record, via reader/writer 315. CPU 352 then reads a pointer record and, using the pointer record, reads table 8435 in EEPROM 8462 of the customer card, and temporarily stores table 8435 contents in memory 333.

A communication protocol between reader/writer 315 and a customer card is described in more detail in ISO 7816-3: 1989 (E), Identification cards—Integrated circuit(s) cards with contacts—Part 3: Electronic signals and transmission protocols; and ISO 7816-3: 1989/Amd. 1: 1992 (E), Part 3: Electronic signals and transmission protocols, AMENDMENT 1: Protocol type T=1, synchronous half duplex block transmission protocol. Both of these standards are promulgated by the International Organization for Standardization (ISO) and distributed by the American National Standards Institute (ANSI).

When CPU 352 receives a product message containing a product UPC code from CPU 350, CPU 352 searches for the product UPC code in redemption control table 347. If this search of table 347 does not result in a match, there is not discount resulting from the current product. If this search of table 347 does result in a match, CPU 352 searches coupon table 8435, from the customer card, for the value in the coupon ID field of the matching entry in table 347. If this search of table 8435 does not result in a match, there is no discount resulting from the current product.

If the searches of redemption control table 347 and coupon table 8435 both result in matches, CPU 352 increments an accumulator corresponding to the matching entry in table 347, to record the quantity of the product. More specifically, CPU 352 increments an array element: PRODUCT_COUNT [TABLE_347_INDEX]=PRODUCT_COUNT [TABLE_347_INDEX]+1, wherein PRODUCT_

COUNT is an array and TABLE_347_INDEX is the index of the matching entry in table 347.

CPU 352 determines whether the qualifier conditions are satisfied for the currently selected coupon. If the qualifier conditions are satisfied and the coupon is a manufacturer coupon, the coupon quantity is added to a variable DISCOUNT_TENDER_PRETAX. If the qualifier are satisfied and the coupon is a retailer coupon, the coupon quantity is added to a variable DISCOUNT_TENDER_POSTTAX.

Thus, processing, of the product UPC messages received from CPU 350, iterates through each combination of coupon and product. Essentially, this iteration is performed with products changing in an outerloop and coupons changing in an innerloop.

CPU 352 sends discount information to CPU 350, in the form of tender messages reflecting values of DISCOUNT_TENDER_PRETAX, and containing information to be displayed to the customer. In response to such messages, CPU 350 adds to a total discount amount and may print text on printer 354.

CPU 352 sends discount information to CPU 350, in the form of tender messages reflecting values of DISCOUNT_TENDER_POSTTAX, and containing information to be displayed to the consumer. In response to such messages, CPU 350 adds to a total discount amount, and may print text on printer 354.

Processing may allow effected discount offers to be printed on printer 354, adjacent the relevant product text, during the checkout transaction. For example, before CPU 350 sends a UPC product message to CPU 352, CPU 350 could receive a tender message from CPU 352 resulting from a previous product message sent to CPU 352.

The search of redemption control table 347 may be more elaborate than that outlined above. For example, when a binary search is employed to locate the first matching UPC and that search is successful, other matches may sought above or below the one located, due to the possibility of duplicates. Further, to represent multiple UPCs in some family hierarchies, any digit or digits of a UPC may be represented as a "wildcard," which is a character matching any digit. A wildcard character may be expressed in human readable form as the character '?', for example. In the internal, "BCD" representation, the hexadecimal digit F will be used to represent a wildcard character. When a binary search in table 347 is unsuccessful, CPU 352 could linearly search records with higher UPC values than the one pointed to by the binary search, through all contiguous records that have the Wildcard flag bit set, or until a record is encountered whose value to the left of the first wildcard character is greater than that of the corresponding digits of the item.

Second Preferred Embodiment

A system in accordance with a second preferred embodiment of the present invention will now be described. The second preferred embodiment includes the features of the first preferred embodiment, except for differences as described below.

Figure 26:
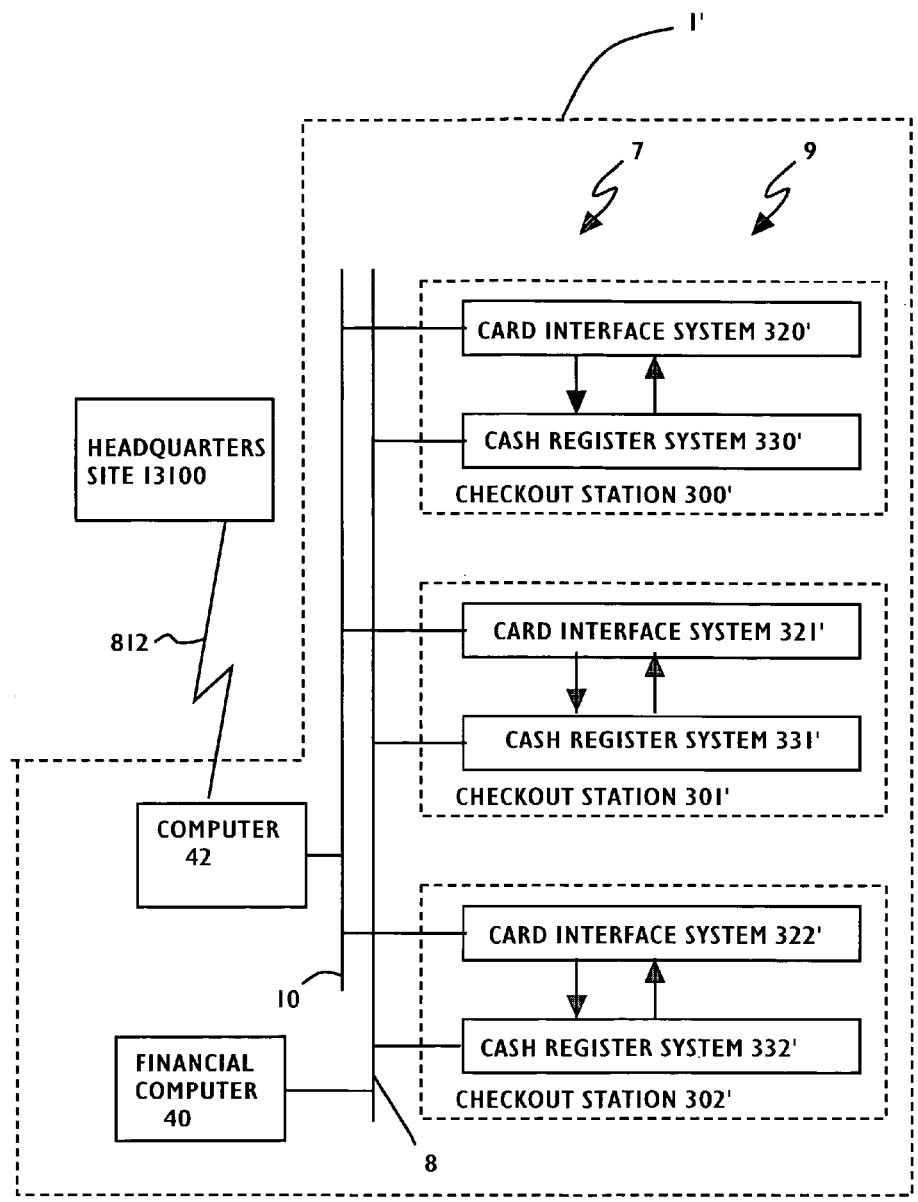
FIG. 26 is a block diagram of the second preferred computer system.
Figure 27:
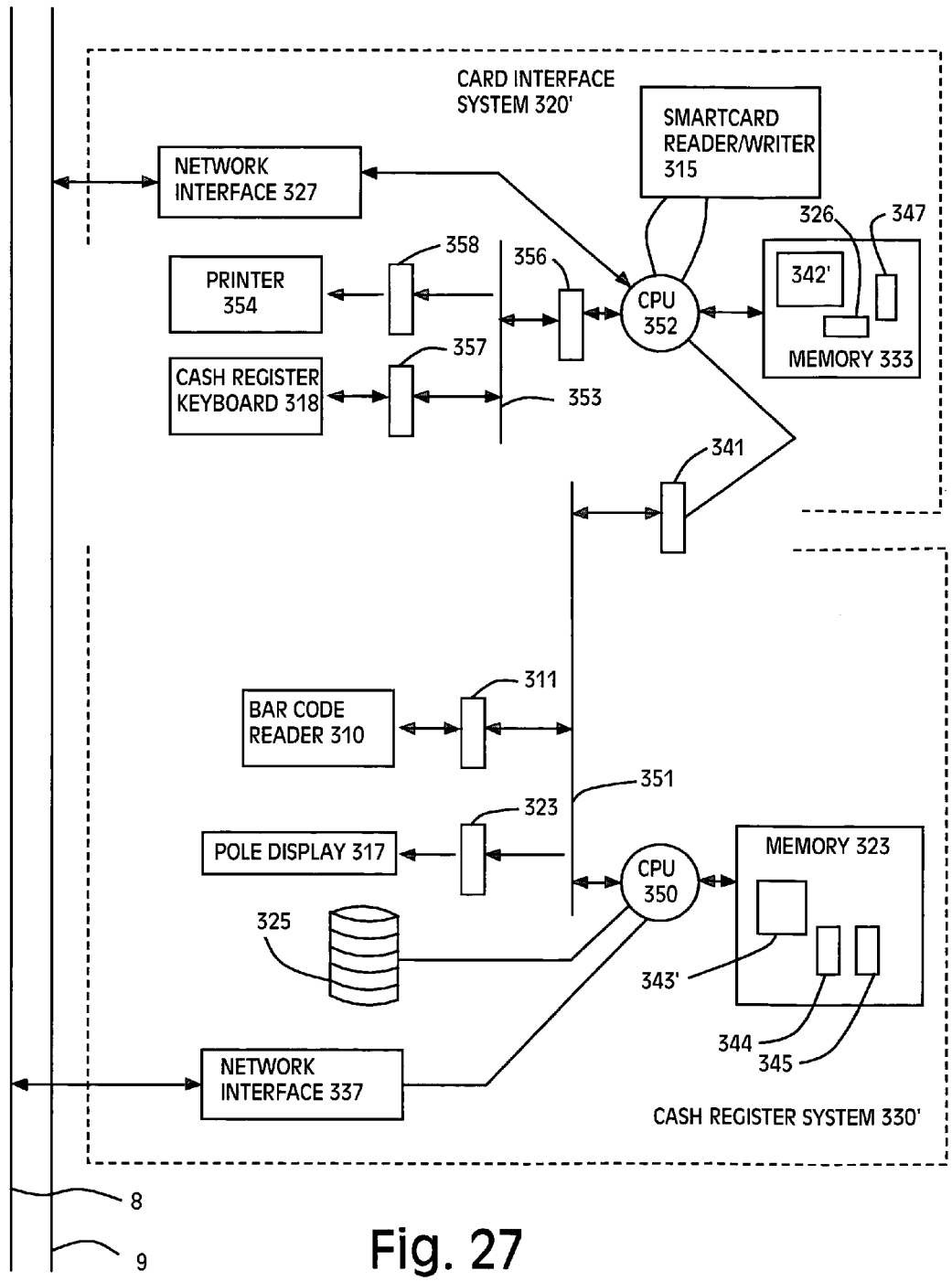
FIG. 27 is a block diagram of the checkout station in the second preferred embodiment.

FIG. 26 shows a store 1' in accordance with the second preferred embodiment. FIG. 27 is a block diagram of checkout station 300' including cash register system 330' and card interface system 320'. CPU 352 executes program 342' in memory 333. CPU 352 and program 342' act to receive electronic coupons from a customer card, via reader/writer 315. In contrast to the first preferred embodiment, the card interface system 320' in the second preferred embodiment receives data from the IBM 4680-4690 cash register system via RS-485 serial bus 351.

Cash register keyboard 318 allows manual entry of alpha-numeric-data, which is sent to CPU 350 via bus interface hardware 357, bus 353, bus interface hardware 356, CPU 352, bus interface hardware 341; and bus 351. CPU 352 and bus interface hardware 341 cooperate to recognize a bus 351 address for cash register keyboard 318. Thus, to CPU 350, cash register keyboard 318 appears to be a device on bus 351.

CPU 352 and interface hardware 341 also cooperate to recognize a bus 351 address for printer 354. Thus, to CPU 350, printer 354 appears to be a device on bus 351.

Checkout stations 301' and 302' each have the same capabilities and hardware as checkout station 300'.

Figure 28:
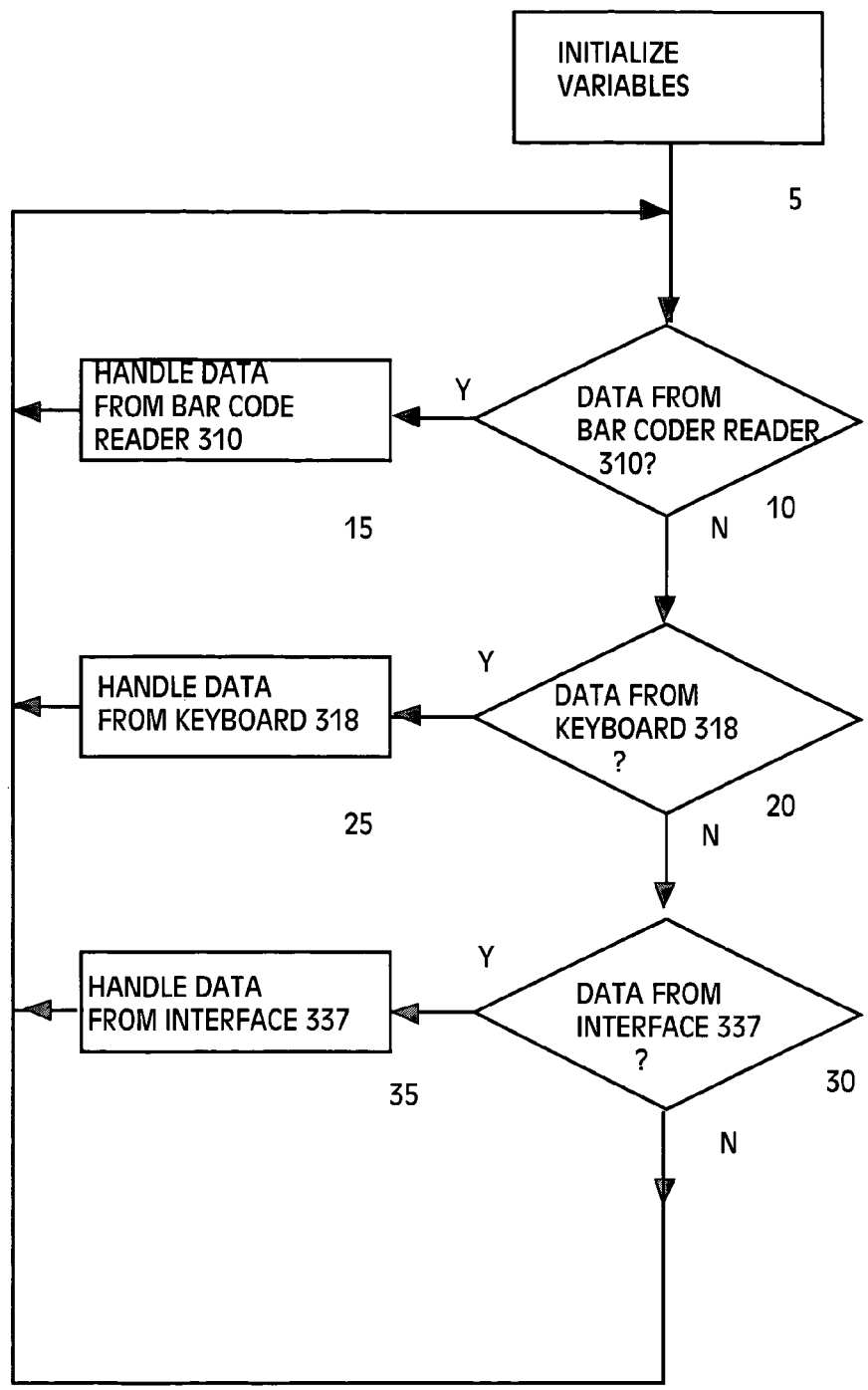
FIG. 28 is a flow chart of a processing performed by part of a checkout station in the second preferred embodiment.

FIG. 28 represents a basic process performed by CPU 350 and program 343'. To prepare for processing a new customer, CPU 350 initializes various customer lists, including a list of products selected by the customer. (step 5). CPU 350 polls the various peripheral devices to receive any input data. CPU 350 polls bar code reader 310 by sending the bus address of bar code reader 310 on bus 351. CPU 350 determines whether bar code reader 310 responds to the poll. (step 10). If bar code reader 310 responds to the poll, CPU 350 passes control to a subprogram of program 343' to handle data from bar code reader 310. (step 15).

If bar code reader 310 does not respond to the poll, CPU 350 polls keyboard 318 by sending the bus address of keyboard of 318 over bus 351. CPU 350 determines whether CPU 350 receives a response to the poll of keyboard 318. (step 20). If CPU 350 receives a response to the poll of keyboard 318, CPU 350 passes control to a subprogram of program of 343' for handling input from keyboard 318. (step 25).

CPU 350 determines whether network interface 337 has data. (step 30). If interface 337 has data, CPU 350 passes control to a subprogram of program 343' for handling data from network interface 337. (step 35).

Figure 29:
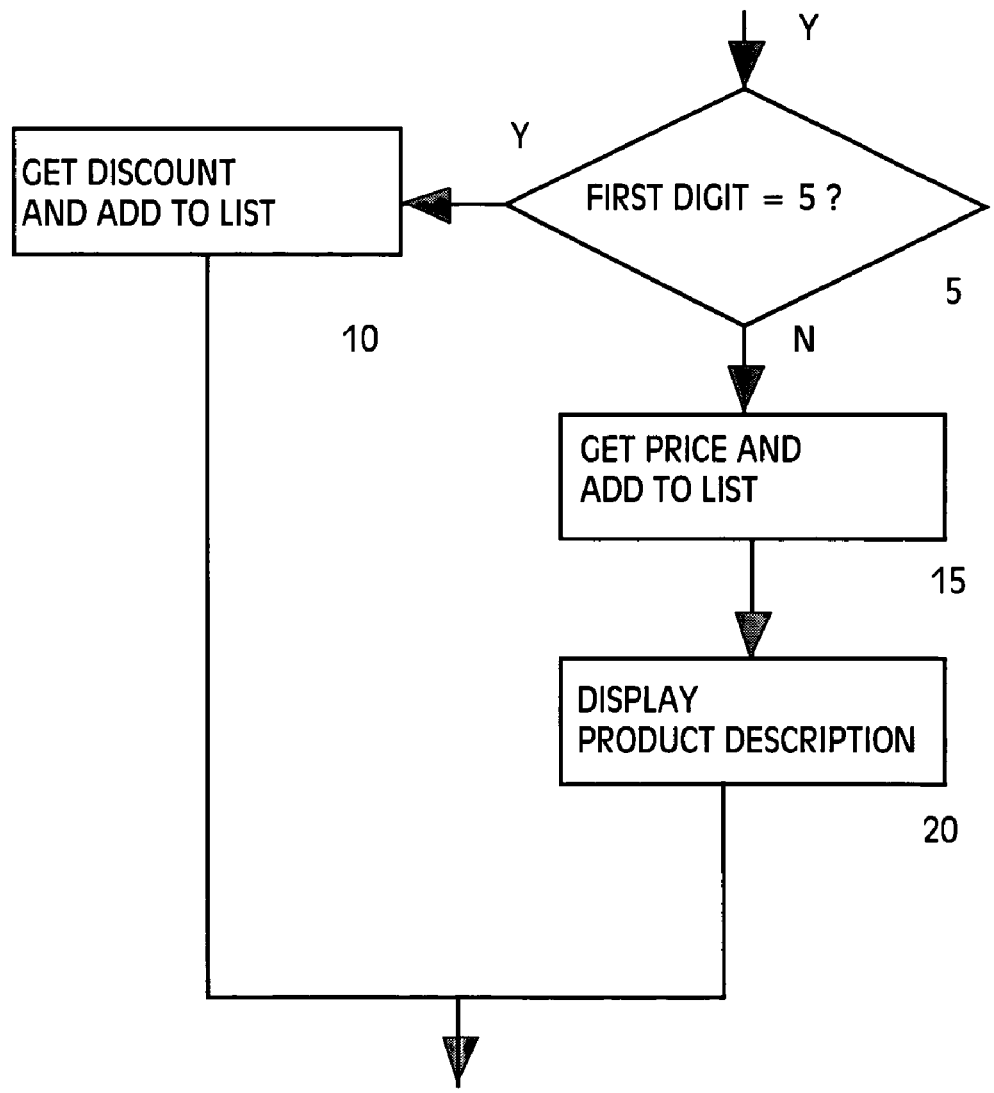
FIG. 29 is a flow chart of a processing performed by a part of the checkout station in the second preferred embodiment.

FIG. 29 shows processing of step 15 of FIG. 28 in more detail. When the clerk (not shown) moves an product past UPC reader 310, UPC reader 310 detects the bar code on the product and sends the bar code to CPU 350. If a bar code has been received and the first digit is a 5 (step 5), CPU 350 sends a message 3006 (FIG. 11) and receives a message 3008 (FIG. 12) to get the discount corresponding to the UPC coupon code. CPU 350 then makes a record including the coupon and the discount amount, and adds this record to a temporary UPC coupon list 344 in memory 323 (step 10).

If the first digit is not a 5, meaning that the code is a UPC product code, CPU 350 sends a message 3002 (FIG. 9) and receives a message 3004 (FIG. 10) to get the price of the product, the UPC coupon family code of the product, and the textual description of the product. CPU 350 then makes a record including the product code, the product price, and the UPC coupon family code, and adds this record to a temporary product list 345 in memory 323. (step 15). CPU 350 then sends a signal encoding the textual description of the product to display 317, and display 317 generates a human readable output describing the product. (step 20).

Figure 30:
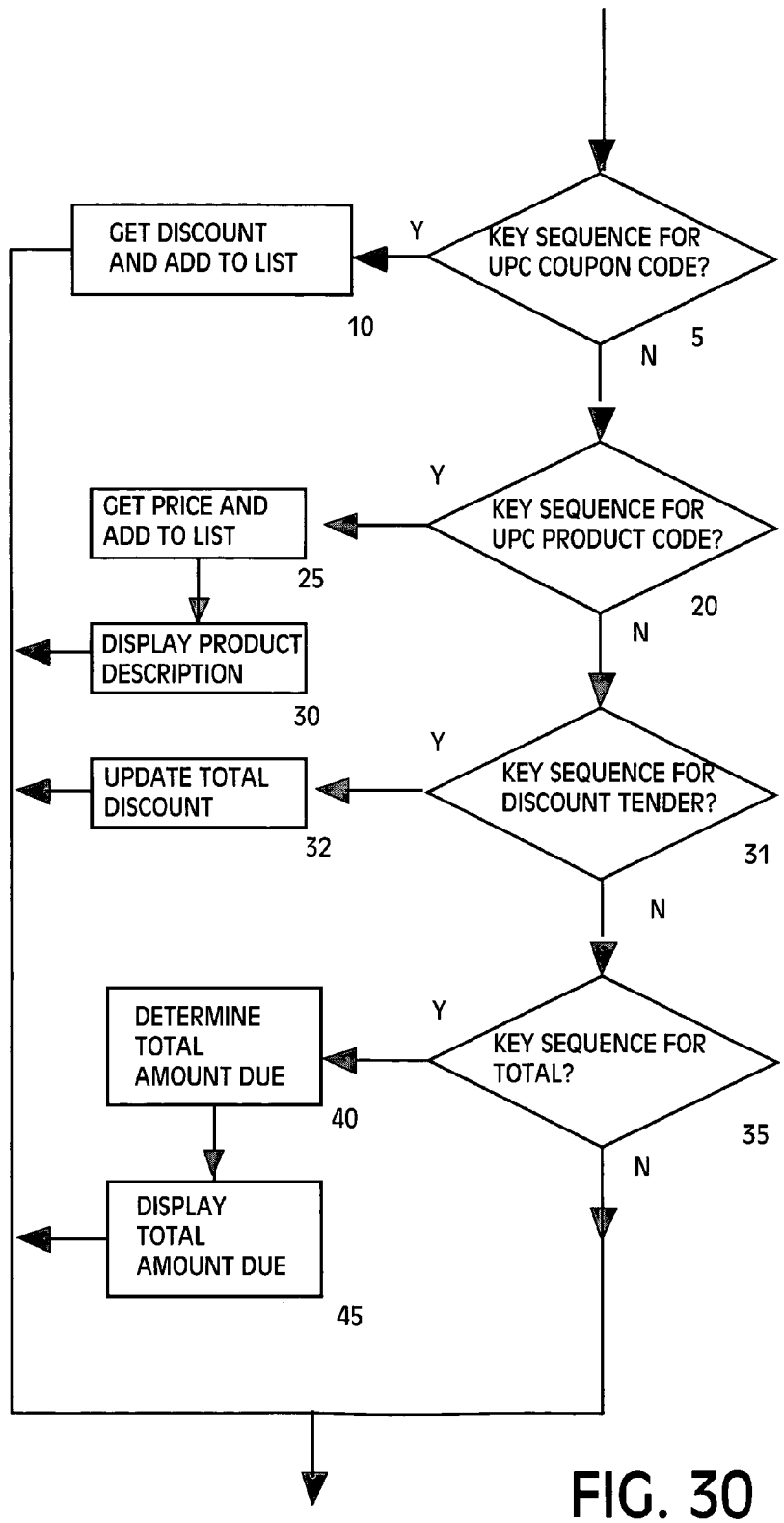
FIG. 30 is a flow chart of a processing performed by a part of the checkout station in the second preferred embodiment.

FIG. 30 shows a processing of step 25 of FIG. 28 in more detail. If the clerk enters a key sequence for processing a coupon code, CPU 350 sends a message 3006 (FIG. 11) and receives a message 3008 (FIG. 12) to get the discount corresponding to the UPC coupon code. CPU 350 then makes a record including the coupon and the discount amount, and adds this record to the UPC coupon list 344 in memory 20 (step 10).

If the clerk enters a key sequence for entering a UPC product code (step 15), CPU 350 sends a message 3002

(FIG. 9) and receives a message 3004 (FIG. 10) to get the price of the product, the UPC coupon family code of the product, and the textual description of the product. CPU 350 then makes a record including the product code, the product price, and the UPC coupon family code, and adds this record to a temporary product list 345 in memory 323. (step 25). CPU 350 then sends a signal encoding the textual description of the product to display 317, and display 317 generates a human readable output describing the product (step 30).

CPU 350 processes each entry in product list 345. If a product in list 345 has a corresponding UPC code in list 344, CPU 350 adds the coupon's discount value to a total discount amount, to offset a subsequently calculated amount due.

If the clerk enters a key sequence for a discount tender (step 31), CPU 350 adds the value of the tender to a total discount amount, to offset a subsequently calculated amount due (step 32).

When the clerk activates the TOTAL button 349 (step 35), CPU 350 determines the total amount due for the checkout transaction by subtracting the total discount amounts from the results of a total product price calculation. (step 40). Step 40 acts to effect discounts received from card interface system 320' because card interface system 320' will have sent discount tenders as emulated keyboard input via interface 341 and bus 351, as described below. Such emulated keyboard input will have been processed by step 32 of FIG. 30.

In response to receiving a UPC product code from cash register system 330', system 320' updates variables DISCOUNT_TENDER_POSTTAX or DISCOUNT_TENDER_PRETAX with the same processing as performed by system 320 in the first preferred embodiment described above. In contrast to the first preferred embodiment, however, system 320' does not receive UPC product codes via a message dedicated to system 320'. Instead, CPU 352 in system 320' monitors bus 351, via interface hardware 341, to detect UPC product codes from bar code reader 310. Because CPU 352 is in the signal path between cash register keyboard 318 and CPU 350, CPU 352 also detects UPC product codes entered manually via cash register keyboard 318. To enhance the second preferred embodiment, CPU 352 could subsequently monitor the pole display and/or printer output, thereby ensuring that store 1' processed a detected UPC product code.

As CPU 352 detects correspondence between received UPC product codes and coupons on a customer card CPU 352 may print informational messages on the customer's receipt tape via printer 354. Thus, information about electronic coupon redemptions may appear on the receipt tape adjacent basic product identification and price text originating from CPU 350.

If CPU 352 determines that the checkout transaction is complete, by detecting activation of the TOTAL button 349, 352 finishes coupon processing by waiting for CPU 350 to pole keyboard 318 on bus 351. When CPU 352 detects such a pole, CPU 352 sends the value of DISCOUNT_TENDER_PRETAX as an emulated keyboard sequence for a discount tender via interface 341, sends the value of DISCOUNT_TENDER_POSTTAX as an emulated keyboard sequence for a discount tender via interface 341, and then sends the code for the TOTAL button 349 as emulated keyboard input via interface 341, thereby causing CPU 350 to calculate and display the total amount due.

These discount tenders, and corresponding total discount amounts, could be of types already established in store 1', or could be of separate types dedicated to electronic coupons on customer cards.

Thus, interface system 320' of the second preferred embodiment operates without requiring a substantial change to cash register computer software.

Third Preferred Embodiment

Figure 31:
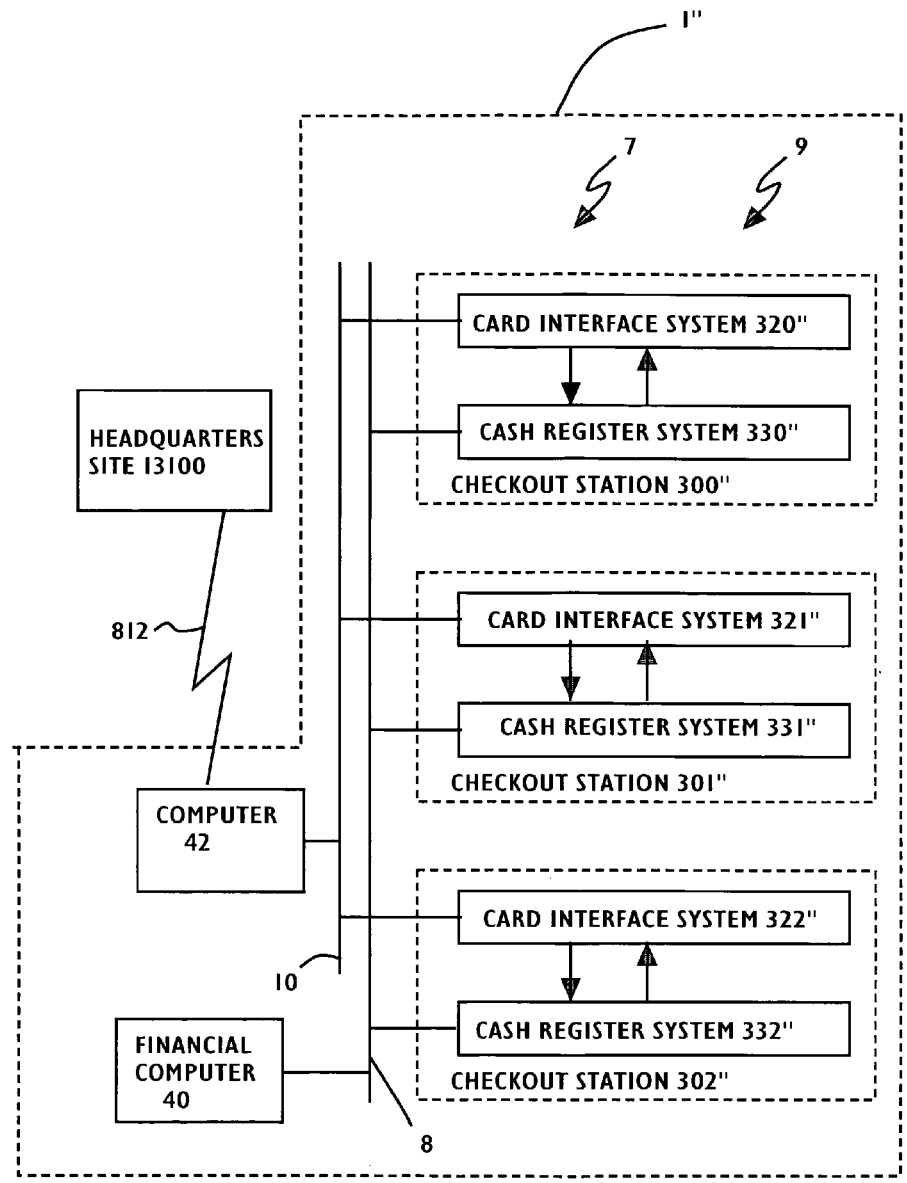
FIG. 31 is a block diagram of the third preferred computer system.
Figure 32:
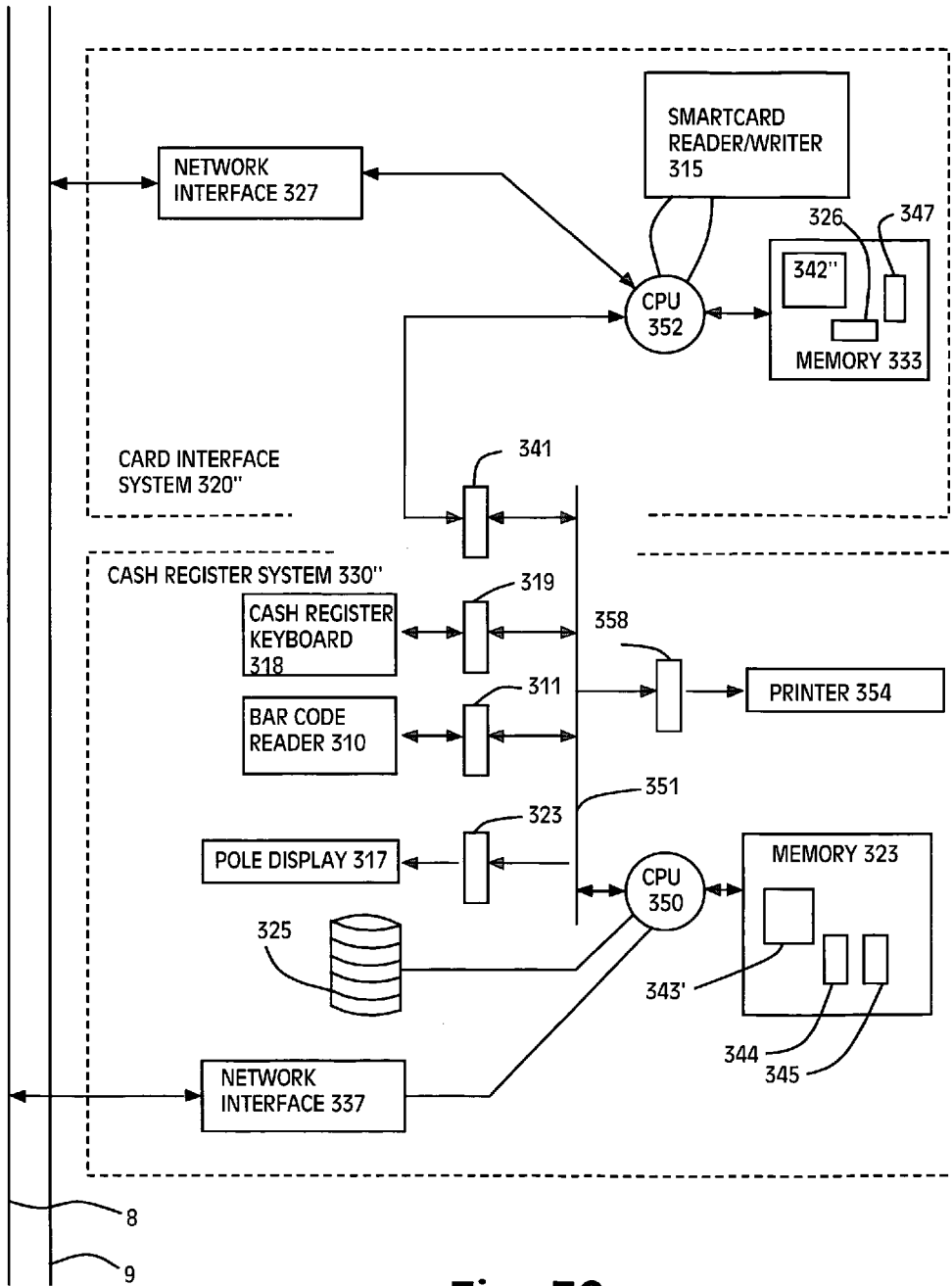
FIG. 32 is a block diagram of a checkout station shown in FIG. 31.

FIG. 31 is a block diagram of supermarket 1" in accordance with a third preferred embodiment for the present invention. FIG. 32 is a block diagram of checkout station 300" shown in FIG. 31, including cash register system 330" and card interface system 320".

Total button 349 is essentially a switch that generates a signal indicating the end of a checkout transaction for a customer, the switch being activatable by the checkout clerk. In contrast to the second embodiment, the signal path between button 349 and CPU 350 excludes CPU 352; the signal path between cash register keyboard 318 and CPU 350 excludes CPU 352. CPU 352 may recognize activation of the total button 349 by monitoring bus 351.

In contrast to the second embodiment, and the signal path between CPU 350 and printer 354 excludes CPU 352. Printer 354 generates a report of the checkout transaction for a customer.

CPU 352 executes program 342" in memory 333. CPU 352 and program 342" act to receive electronic coupons from a customer card, via reader/writer 315. In contrast to the first preferred embodiment, card interface system 320" receives data from the IBM 4680-4690 cash register system via RS-485 serial bus 351.

Cash register keyboard 318 allows manual entry of alpha-numeric-data, which is sent to directly to CPU 350 via bus interface hardware 319 and bus 351.

Checkout stations 301" and 302" each have the same capabilities and hardware as checkout station 300".

CPU 350 and program 343' of the third embodiment execute the identical process of CPU 350 and program 343' of the second embodiment. Thus, when the clerk activates the TOTAL button 349, CPU 350 determines the total amount due for the checkout transaction by subtracting the total discount amounts from the results of a total product price calculation. CPU 350 and program 343' of the third embodiment act to effect discounts received from card interface system 320" because card interface system 320" will have sent discount tenders as emulated keyboard input via interface 341 and bus 351, as described below.

In response to receiving a UPC product code from cash register system 330", system 320" updates variables DISCOUNT_TENDER_POSTTAX or DISCOUNT_ TENDER_PRETAX with the same processing as performed by system 320 in the first preferred embodiment described above. In contrast to the first preferred embodiment, however, system 320" does not receive UPC product codes via a message dedicated to system 320". Instead, CPU 352 in system 320' monitors bus 351, via interface hardware 341, to detect UPC product codes from bar code reader 310; and CPU 352 in system 320" monitors bus 351, via interface hardware 341, to detect UPC product codes entered manually via cash register keyboard 318. To enhance the third preferred embodiment, CPU 352 could subsequently monitor the pole display and/or printer output, thereby ensuring that store 1" processed a detected UPC product code.

As CPU 352 detects correspondence between received UPC product codes and coupons on a customer card CPU 352 may print informational messages on the customer's receipt tape via interface hardware 341 and printer 354. Thus, information about electronic coupon redemptions may appear on the receipt tape adjacent basic product identification and price text originating from CPU 350.

CPU 352 may determine that the checkout transaction is complete, by detecting activation of the TOTAL button 349 or monitoring the state of pole display 317, for example. When CPU 352 determines that the checkout transaction is complete, 352 finishes coupon processing by waiting for CPU 350 to pole keyboard 318 on bus 351. When CPU 352 detects such a pole, CPU 352 sends the value of DISCOUNT_TENDER_PRETAX as an emulated keyboard sequence for a discount tender via interface 341, and sends the value of DISCOUNT_TENDER_POSTTAX as an emulated keyboard sequence for a discount tender via interface 341, thereby causing CPU 350 to adjust the total amount due.

These discount tenders, and corresponding total discount amounts, could be of types already established in store 1", or could be of separate types dedicated to electronic coupons on customer cards.

Thus, interface system 320" of the third preferred embodiment operates with conventional cash register computer hardware without requiring a substantial change to cash register computer software, and without requiring a substantial change to the peripheral configuration of the conventional cash register computer.

Instead of waiting for poles directed to keyboard 318, cash register system 330" could be configured with a second keyboard in a table in system 330". Such a second keyboard would not actually exist in hardware. When CPU 350 directs poles to this virtual second keyboard, card interface system 320" could respond with an emulated keyboard sequence for a discount tender.

Fourth Preferred Embodiment

Figure 33:
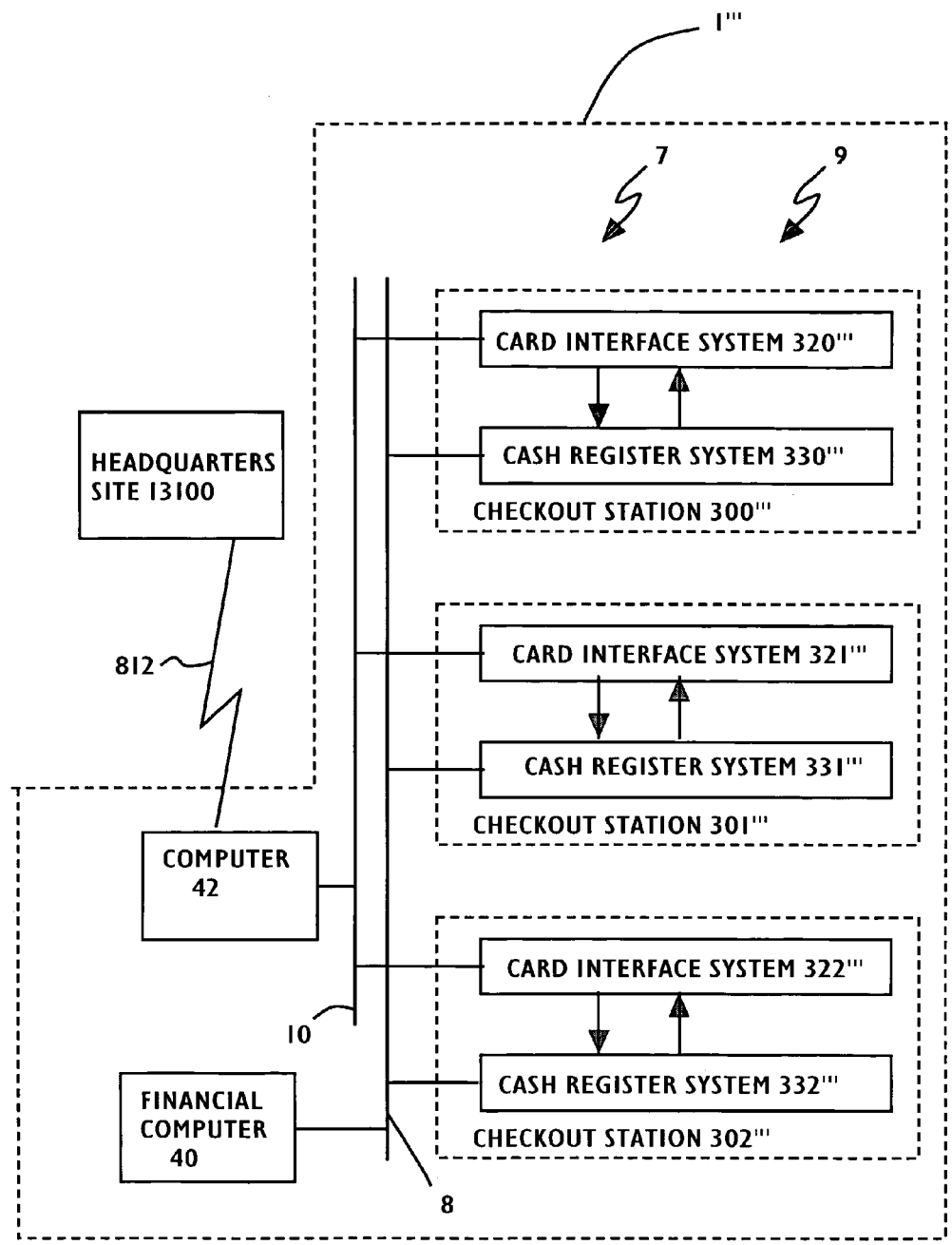
FIG. 33 is a block diagram of the fourth preferred computer system.
Figure 34:
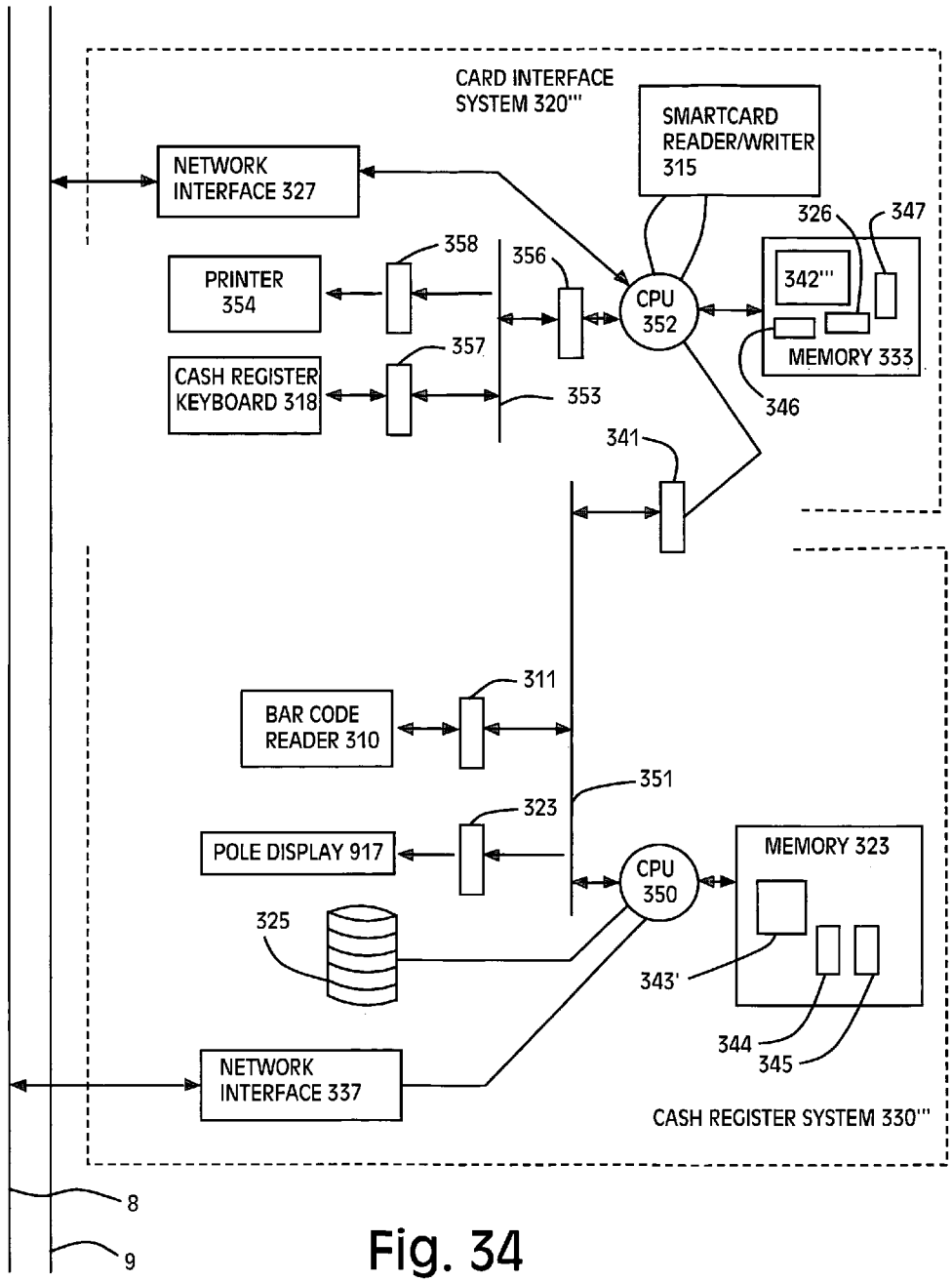
FIG. 34 is a block diagram of a checkout station shown in FIG. 33.

FIG. 33 is a block diagram of store 1''' in accordance with a fourth preferred embodiment of the present invention. FIG. 34 is a block diagram of checkout station 300''' of FIG. 33, including cash register system 330'''. In contrast to the first, second, and third embodiments, the fourth embodiment processes customer cards that store UPC coupon codes.

CPU 352 executes program 342''' in memory 333. CPU 352 and program 342''' act to receive electronic UPC 5 coupons from a customer card, via reader/writer 315. In contrast to the first embodiment, the card interface system 320' in the fourth embodiment receives data from the IBM 4680-4690 cash register system via RS-485 serial bus 351.

Cash register keyboard 318 allows manual entry of alphanumeric-data, which is sent to CPU 350 via bus interface hardware 357, bus 353, bus interface hardware 356, CPU 352, bus interface hardware 341, and bus 351. CPU 352 and bus interface hardware 341 cooperate to recognize a bus 351 address for cash register keyboard 318. Thus, to CPU 350, cash register keyboard 318 appears to be a device on bus 351.

CPU 352 and interface hardware 341 also cooperate to recognize a bus 351 address for printer 354. Thus, to CPU 350, printer 354 appears to be a device on bus 351.

Checkout stations 301''' and 302''' each have the same capabilities and hardware as checkout station 300'''.

CPU 350 and program 343' of the fourth embodiment execute the identical process of CPU 350 and program 343' of the second embodiment. Thus, when the clerk activates the TOTAL button 349, CPU 350 determines the total amount due for the checkout transaction by subtracting the total discount amounts from the results of a total product price calculation. CPU 350 and program 343' of the fourth embodiment act to effect discounts received from card interface system 320''' because card interface system 320''' will have sent UPC 5 coupon signals via interface 341 and bus 351, as described below.

In response to receiving a UPC product code from cash register system 330''', system 320''', CPU 352 determines whether the UPC product code has a corresponding UPC 5 coupon from EEPROM 8462 of the customer card. A product corresponds to a coupon if the five-digit manufacturer ID in the UPC product code equals the five-digit manufacturer ID in the UPC coupon code from EEPROM 8462, and the three-digit coupon family code for the product (from family code table 346 in memory 333) corresponds to the three-digit family code of the coupon from EEPROM 8462. These two family codes correspond if they are equal or if the coupon family code is a summary code that matches certain digits of the product's coupon family code. If CPU 352 detects this product-coupon correspondence, CPU 352 sends the corresponding coupon from EEPROM 8462 to register system 330''' as emulated keyboard input or emulated bar code input, and erases the corresponding coupon from EEPROM 8462. Subsequently, register system 330''' also detect product-coupon correspondence for the UPC 5 coupons sent from card interface computer 320''', in the conventional UPC 5 coupon processing of the register software, to offset a subsequently calculated total amount due.

In contrast to the first preferred embodiment, system 320''' does not receive UPC product codes via a message dedicated to system 320'''. Instead, CPU 352 in system 320''' monitors bus 351, via interface hardware 341, to detect UPC product codes from bar code reader 310. Because CPU 352 is in the signal path between cash register keyboard 318 and CPU 350, CPU 352 also detects UPC product codes entered manually via cash register keyboard 318. To enhance the fourth preferred embodiment, CPU 352 could subsequently monitor the pole display and/or printer output, thereby ensuring that store 1''' processed a detected UPC product code.

As CPU 352 detects correspondence between received UPC product codes and UPC coupons on a customer card, CPU 352 may print informational messages on the customer's receipt tape. Thus, information about electronic coupon redemptions may appear on the receipt tape adjacent basic product identification and price text originating from CPU 350.

Thus, interface system 320''' of the fourth preferred embodiment operates with conventional cash register computer hardware without requiring a substantial change to cash register computer software, and without requiring a substantial change to the peripheral configuration of the conventional cash register computer.

Thus, the embodiments of the invention described above process card-based promotions without monitoring network 7, or otherwise being responsive to signals on network 7. Interface systems 320, 320', 320", and 320''' receive signals, identifying purchase products, through a signal path that excludes network 7 and excludes network 9.

Additional Description of the Preferred Embodiments

CPU 352 and memory 333 of system 320 are in a relatively small housing that also contains (or has attached) smart-card reader/writer 315. The smart-card access is located conveniently for the clerk.

Headquarters site 13100 manages and sends flights of coupon data to systems 320, 321, and 322 in the stores by way of computer 42 or a system program card. A type of system program card is disclosed in copending application of KEN R. POWELL, ELEANOR B. MAXWELL, and COREY C. SNOOK for SYSTEM AND METHOD EMPLOYING A PORTABLE CARD TO CONFIGURE A STORE FOR PRODUCT PROMOTION, filed concurrently with the instant application, the contents of which is herein incorporated by reference. If computer 42 becomes unavailable for an extended period of time, a contingency distribution module is invoked which distributes the flight update directly to systems 320, 321, and 322. Backup polling logic is put in place in the event that computer 42 (normally the bus master) were not present. In this case a system 320 would perform as an "acting master" in order to allow the flow of flight information directly between system 320 and systems 321 and 322 to provide a contingency flight data distribution plan.

The following types of data are collected and/or maintained by system 320 for collection by the site 13100 via computer 42: redemption criteria, redemption data, dispensing data, shelf unit programming data, basket data 326 and status information. The first four of these are stored in coupon redemption control table 347, show in more detail in FIG. 34.

The first record sent from the Reader/writer 315 for any card read is a header record that indicates the type of card inserted and other data as described in the following paragraphs. The header record is followed by data records.

FIG. 35 shows redemption control table 347 in more detail. Redemption control table 347 includes one row for each currently active coupon offer. Redemption control table 347 contains sufficient entries for the current flight (promotion period) and the previous one. Several days following the introduction of new flight data, old flight data is cleared to avoid improper redemptions.

For each coupon ID from the coupon cells of a customer card, CPU 352 compares the Product UPC field in the corresponding entry in the Redemption Control table 347 to the UPC of the product purchased. If no match is found, there is no redemption, otherwise the qualifier fields are examined to further qualify the product. If the product qualifies, then the award fields are used to calculate the amount of award as described in the following paragraphs.

In order to facilitate the representation of multiple UPCs in some family hierarchies, any digit or digits of a UPC may be represented as a "wildcard". A wildcard is a character matching any digit. These wildcard characters may be expressed in textual (human) input as the character '?'. In the internal, "BCD" representation, the hexadecimal digit F is used to represent a wildcard character. Thus a UPC of 10502FFFFF would match any product with manufacturer code 10502. Since a wildcard digit will sort after a BCD digit, a product specified uniquely will always be checked for qualification first, before the same one specified with one or more wildcards. This provides an product "exception" mechanism using a Qualifier Type of Non-redeem.

In FIG. 35, the Qualifier Type is a single-byte integer value representing the type of qualification required. The qualifier type values, explained in FIG. 45, are used to interpret the Qualifier Quantity.

In FIG. 35, the Qualifier Quantity is a single-byte integer value representing the number of items (product count), dollar value, or weight of the items corresponding to the specified UPC which must be purchased in order to qualify for the redemption of the coupon offer, depending on the value of Qualifier Type (see above).

In FIG. 35, each of flags and reward type fields is a 4 bit value. The flags field is explained in FIG. 36. The reward type field is explained in FIG. 37. The reward amount is a 2-byte (4-digit) BCD value, interpreted in accordance with the reward type field.

In FIG. 35, the tender type field is a single byte value used to determine retailer tender type. This value may vary for store vs. vendor coupons when state law requires different tax types.

In FIG. 35, the Redemption Limit is a single-byte integer value representing the number of times per customer order (or transaction) this offer may be redeemed. A value of 255 is used for "no limit".

In FIG. 35, the Continuation Address is a non-zero value when continuation records are used to represent additional qualifications to the offer (usually additional items).

FIG. 36 is a diagram showing values for the qualifier type field of the redemption control table shown in FIG. 35.

FIG. 37 is a diagram of showing values for the flag bits field of the redemption control table shown in FIG. 35.

FIG. 38 is a diagram of a showing values for the reward type field of the redemption control table shown in FIG. 35.

A redemption total amount is updated with each redemption. Redemption information is returned to computer 42 as it is requested by site 13100.

Basket data 326 will now be described in more detail. System 320 appends products purchased by a particular customer to the basket data 326, and sends basket data 326 is sent to computer 42 as it is requested by site 13100. Basket data 326 includes Customer Card ID 8467, Customer Profiles, Date of checkout transaction, Time of Day of checkout transaction, Register (lane) Number, and, for each product purchased or coupon redeemed: UPC, Price (signed), Quantity (signed).

The Customer Card ID 8467 is a 12-digit BCD field (6 bytes). It is filled with all zeros if the current order is not an identified order.

There are 2 Customer Profiles: profile1 and profile2, each a 4-byte integer. They are filled with all zeros if the current order is not an identified order.

The Transaction Date is a 3-byte BCD field representing the date of the transaction as YYMMDD (year, month, day).

The Transaction Time is a 3-byte BCD field representing the time of the transaction as HHMMSS (hours, minutes, seconds).

The Register (lane) Number is a 2-byte (4-digit) BCD field.

The Product UPC is a 12-digit BCD field (6 bytes). It does not include a trailing check digit.

The Price is an 8-digit BCD field (4 bytes) representing cents. The price represents the unit price, which is multiplied by the quantity to determine total purchase price.

The Quantity is a 4-digit BCD field (2 bytes) representing number of products of each UPC purchased. A leading digit of hexadecimal F reflects a negative sign (a return or void or earlier product(s)).

CONCLUSION

According to an aspect of the preferred embodiments described above, if coupon codes or indices are to be considered a type of first signal corresponding to product pricing, and a UPC product code is considered to be a type of second signal identifying products selected for purchase, CPU 350 executes a program in memory 323 to correlate second signals with first signals. CPU 350 essentially receives second signals from bar code reader 310 to send a third signal to the CPU 350, wherein CPU 350 displays an amount due responsive to the third signal. The invention could be practiced with such a third signal taking numerous forms including various types of discount, cash, or credit tenders corresponding to tenders recognized by point-of-sale systems. This third signal could take a form interpreted by dedicated logic in the point-of-sale system, such as the logic implemented by the user exits of the first embodiment.

Although the preferred embodiments described above each generate a type of third signal responsive to a customer specific signal, in the form of coupons on a customer's card, generation of this third signal need not be responsive to customer specific information, and may instead be a function of a all-customer discount as disclosed in discount system 320' of the second embodiment of the invention in copending application of KEN R. POWELL, ELEANOR B. MAXWELL, and COREY C. SNOOK for SYSTEM AND METHOD EMPLOYING A PORTABLE CARD TO CONFIGURE A STORE FOR PRODUCT PROMOTION, filed concurrently with the instant application, the contents of which is herein incorporated by reference.

Alternately, although the preferred embodiments and the system described in the previous paragraph essentially send a type of this third signal by correlating a discount with products purchased, in its broader sense the invention does not require such correlation. For example, in its broader sense the invention my encompass sending this third signal responsive solely to a profile of the customer or solely to past purchasing patterns as represented by accumulated points for example.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A system for operating with a plurality of portable cards each having a card memory, and a store having a plurality of products, the system comprising:
   a plurality of cash register stations, each cash register station including
      an electromagnetic detector for generating first signals corresponding to product pricing and for generating second signals identifying products selected for purchase;
      a card interface for reading third signals corresponding to product pricing from the card memory of one of the portable cards;
      a first processing unit that executes a first program in a first memory to correlate second signals with first signals,
   wherein the system also includes a plurality of second processing units different from the first processing units, each second processing unit executing a second program in a second memory, to determine a discount quantity by correlating second signals from the electromagnetic detector, in a respective one of the cash register stations, with the third signals read by the card interface, in the respective one of the cash register stations, wherein each second processing unit is in the respective one of the cash register stations.

2. The system of claim 1 further including
   a central computer that communicates product pricing information with each of the first processing units.

3. The system of claim 1 further including
   a network including a common computer that communicates pricing information, wherein the first processing unit, of each cash register station, is in the network, and wherein the second processing unit, of each cash register station, receives the second signals from a signal path that excludes the network.

4. The system of claim 1 further including
   a switch that generates a signal indicating the end of a checkout transaction for a customer, the switch being activatable by a clerk,
   wherein the second processing unit is in a signal path between the switch and the first processing unit.

5. The system of claim 1 further including
   a signal path from the second processing unit to the first processing unit,
   wherein the second processing unit sends a signal indicating a tender of a discount to the first processing unit, via the signal path.

6. The system of claim 1 further including
   a switch that generates a signal indicating the end of a checkout transaction for a customer, the switch being activatable by a clerk,
   wherein a signal path between the switch and the first processing unit excludes the second processing unit.

7. The system of claim 1 further including
   a signal path from the second processing unit to the first processing unit,
   wherein the second processing unit sends a signal indicating a UPC coupon to the first processing unit, via the signal path.

8. A system for operating with a plurality of portable cards each having a card memory for storing product discount information, and a store with a plurality of products, the system comprising:
   a plurality of cash register stations, each cash register station including
      an electromagnetic detector for generating first signals corresponding to product pricing and for generating second signals identifying products selected for purchase;
      a card interface for reading from the card memory of one of the portable of cards;
      a first processing unit that executes a first program in a first memory to correlate second signals with first signals,
      a signal path between a peripheral device and the first processing unit,
      a second processing unit different from the first processing unit, responsive to a signal on the signal path, that executes a second program in a second memory, to determine a discount quantity by correlating second signals with third signals from the card memory of one of the plurality of cards,
   wherein the first processing unit determines a total amount due by receiving a fourth signal from the second processing unit, wherein the fourth signal corresponds to a discount tender.

9. The system of claim 8 wherein the peripheral device is an input device.

10. The system of claim 8 wherein the signal path carries product identification information.

11. The system of claim 8 wherein the peripheral device is the electromagnetic detector.

12. The system of claim 8 further including a medium for a first computer network, wherein a first network-interface, in each cash register station, is an interface to the first computer network.

* * * * *